(12) United States Patent
Herre et al.

(10) Patent No.: US 12,302,086 B2
(45) Date of Patent: *May 13, 2025

(54) CONCEPT FOR GENERATING AN ENHANCED SOUND FIELD DESCRIPTION OR A MODIFIED SOUND FIELD DESCRIPTION USING A MULTI-POINT SOUND FIELD DESCRIPTION

(71) Applicant: Fraunhofer-Gesellschaft zur Foerderung der angewandten Forschung e.V., Munich (DE)

(72) Inventors: Juergen Herre, Erlangen (DE); Emanuel Habets, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,090

(22) Filed: Nov. 17, 2023

(65) Prior Publication Data
US 2024/0098445 A1 Mar. 21, 2024

Related U.S. Application Data

(60) Division of application No. 17/898,016, filed on Aug. 29, 2022, now Pat. No. 11,950,085, which is a
(Continued)

(30) Foreign Application Priority Data

Jul. 14, 2017 (EP) .................................... 17181488

(51) Int. Cl.
*H04S 7/00* (2006.01)
*G10L 19/008* (2013.01)
(Continued)

(52) U.S. Cl.
CPC ............ *H04S 7/303* (2013.01); *G10L 19/008* (2013.01); *G10L 21/0272* (2013.01);
(Continued)

(58) Field of Classification Search
None
See application file for complete search history.

(56) References Cited

U.S. PATENT DOCUMENTS 4,042,779 A 8/1977 Craven et al.
9,196,257 B2 11/2015 Schultz-amling et al.
(Continued)

FOREIGN PATENT DOCUMENTS

CN 102326417 A 1/2012
CN 102859584 A 1/2013
(Continued)

OTHER PUBLICATIONS

"ITU-R BS.1534-3, Method for the subjective assessment of intermediate quality level of audio systems", International Telecommunication Union, 2015, Oct. 2015, 36 pp.
(Continued)

*Primary Examiner* — Paul W Huber
(74) *Attorney, Agent, or Firm* — Perkins Coie LLP; Michael A. Glenn

(57) ABSTRACT

Apparatus for generating an enhanced sound field description, including: a sound field generator for generating at least one sound field description indicating a sound field with respect to at least one reference location; and a meta data generator for generating meta data relating to spatial information of the sound field, wherein the at least one sound field description and the meta data constitute the enhanced sound field description. The at least one sound field description includes in a certain case a first sound field description related to the at least one reference location and a second
(Continued)

sound field description related to a further reference location being different from the reference location, and the meta data relating to the spatial information indicates the reference location and the further reference location or one of both reference locations and a vector extending between both reference locations.

14 Claims, 16 Drawing Sheets

Related U.S. Application Data continuation of application No. 16/740,272, filed on Jan. 10, 2020, now Pat. No. 11,463,834, which is a continuation of application No. PCT/EP2018/069140, filed on Jul. 13, 2018.

(51) Int. Cl.
   G10L 21/0272 (2013.01)
   H04S 3/00 (2006.01)
(52) U.S. Cl.
   CPC .......... *H04S 3/008* (2013.01); *H04S 2400/01* (2013.01); *H04S 2400/11* (2013.01); *H04S 2400/15* (2013.01); *H04S 2420/01* (2013.01); *H04S 2420/11* (2013.01)

(56) References Cited

U.S. PATENT DOCUMENTS

| 9,769,588 | B2 | 9/2017 | Shenoy et al. |
| 2007/0274528 | A1 | 11/2007 | Nakamoto et al. |
| 2011/0305344 | A1 | 12/2011 | Sole et al. |
| 2012/0155653 | A1 | 6/2012 | Jax et al. |
| 2013/0016842 | A1 | 1/2013 | Schultz-amling et al. |
| 2013/0142341 | A1 | 6/2013 | Del Galdo et al. |
| 2013/0216070 | A1 | 8/2013 | Keiler et al. |
| 2014/0023197 | A1 | 1/2014 | Xiang et al. |
| 2014/0133660 | A1 | 5/2014 | Jax et al. |
| 2014/0241528 | A1 | 8/2014 | Gunawan et al. |
| 2014/0249827 | A1 | 9/2014 | Sen et al. |
| 2014/0355766 | A1 | 12/2014 | Morrell et al. |
| 2014/0358557 | A1 | 12/2014 | Sen et al. |
| 2014/0358567 | A1 | 12/2014 | Koppens et al. |
| 2015/0127354 | A1 | 5/2015 | Peters et al. |
| 2015/0223002 | A1 | 8/2015 | Mehta et al. |
| 2015/0271621 | A1 | 9/2015 | Sen et al. |
| 2015/0296319 | A1 | 10/2015 | Shenoy et al. |
| 2016/0142851 | A1 | 5/2016 | Sun et al. |
| 2016/0309273 | A1 | 10/2016 | Keiler et al. |
| 2017/0125030 | A1 | 5/2017 | Koppens et al. |
| 2017/0243589 | A1 | 8/2017 | Krueger et al. |
| 2018/0206057 | A1 | 7/2018 | Kim et al. |
| 2018/0359594 | A1 | 12/2018 | Maeno et al. |

FOREIGN PATENT DOCUMENTS

| CN | 103250207 A | 8/2013 |
| CN | 103460285 A | 12/2013 |
| CN | 103635964 A | 3/2014 |
| CN | 104185869 A | 12/2014 |
| CN | 104244164 A | 12/2014 |
| CN | 105637902 A | 6/2016 |
| CN | 106104680 A | 11/2016 |
| EP | 2346028 A1 | 7/2011 |
| JP | H08107600 A | 4/1996 |
| JP | 2006074589 A | 3/2006 |
| JP | 2013514696 A | 4/2013 |
| JP | 2013545391 A | 12/2013 |
| JP | 2015502573 A | 1/2015 |
| JP | 2015509212 A | 3/2015 |
| KR | 20140000240 A | 1/2014 |
| KR | 20140097555 A | 8/2014 |
| RU | 2609102 C2 | 1/2017 |
| RU | 2015151021 A | 7/2017 |
| TW | 201237849 A | 9/2012 |
| TW | 201334580 A | 8/2013 |
| TW | 201614638 A | 4/2016 |
| WO | 9741711 A1 | 11/1997 |
| WO | 2012072804 A1 | 6/2012 |
| WO | 2013079568 A1 | 6/2013 |
| WO | 2013079663 A2 | 6/2013 |
| WO | 2014015914 A1 | 1/2014 |
| WO | 2014194075 A1 | 12/2014 |
| WO | 2015086337 A1 | 6/2015 |
| WO | 2015107926 A1 | 7/2015 |
| WO | 2016081655 A1 | 5/2016 |
| WO | 2017098949 A1 | 6/2017 |
| WO | 2019013924 A1 | 1/2019 |

OTHER PUBLICATIONS

Altman, M, et al., "Immersive Audio for VR", Audio Engineering Society, Oct. 1, 2016, Conference on Audio for Virtual and Augmented Reality, 8 pp.

Anderson, Robert, et al., "Jump: Virtual Reality Video", ACM Transactions on Graphics, 35(6), p. 198, 2016, pp. 198-198:13.

Bates, Enda, et al., "Spatial Music, Virtual Reality, and 360 Media", Audio Eng. Soc. Int. Conf. on Audio for Virtual and Augmented Reality, Los Angeles, CA, U.S.A., 2016, 8 pp.

Blauert, Jens, "[Part 1 of 2]—Spatial Hearing—Revised Edition: The Psychophysics of Human Sound Localization", The MIT Press, 1996, ISBN 0262024136, pp. 93-128.

Blauert, Jens, "[Part 2 of 2]—Spatial Hearing—Revised Edition: The Psychophysics of Human Sound Localization", , 1996, pp. 129-237.

Bleidt, Robert L., et al., "Development of the MPEG-H TV Audio System for ATSC 3.0", IEEE Transactions on Broadcasting; vol. 63, No. 1, Mar. 2017, pp. 202-236, XP055484143, US; ISSN: 0018-9316, Mar. 2017, pp. 202-236.

Bleidt, Robert L., et al., "Development of the MPEG-HTV Audio System for ATSC 3.011", IEEE Transactions On Broadcasting., vol. 63, No. 1, Mar. 2017 (Mar. 2017).

Boehm, Johanas, et al., "Scalable Decoding Mode for MPEG-H 3D Audio HOA", 108. MPEG Meeting; Mar. 31, 2014- Apr. 4, 2014; Valencia; (Motion Picture Expert Group or ISO/IEC JTC1/SC29/WG11), No. m33195, Mar. 26, 2014, XP03006164, 12 pages.

Boehm, Johannes, et al., "Scalable Decoding Mode for MPEG-H3D Audio HOA", 108. MPEG Meeting; Mar. 31, 2014-Apr. 4, 2014; Valencia; (Motion Picture Expert Group or ISO/IECJTC1/SC29/WG11), No. m33195, Mar. 26, 2014 (Mar. 26, 2014), XP030061647, p. 7, paragraph 2.4-p. 11, paragraph 2.5, pp. 7, 11.

Borß, Christian, "A polygon-based panning method for 3D loudspeaker setups", Audio Eng. Soc. Conv., pp. 343-352, Los Angeles, CA, USA, 2014, pp. 343-352.

Engelke, Ulrich, et al., "Psychophysiology-Based QoE Assessment: A Survey", IEEE Selected Topics in Signal Processing, 11(1), pp. 6-21, 2017, pp. 6-21.

Faller, Christof, et al., "Binaural cue coding—Part II: schemes and applications", IEEE Trans On Speech and Audio Proc., vol. 11, No. 6, pp. 299-310.

Faller, Christof, "Parametric multichannel audio coding: Synthesis of coherence cues" IEEE Trans. Speech Audio Process., vol. 14, No. 1, Jan. 2006, pp. 299-310.

Gerzon, Michael A., "Periphony: With-height sound reproduction", J. Acoust. Soc. Am., vol. 21,110. 1, pp. 2-10, 1973, 1973, pp. 2-10.

Khaddour, Hasan, et al., "A Novel Combined System of Direction Estimation and Sound Zooming of Multiple Speakers", Radioengineering, 24(2), 2015, pp. 583-592.

Kowalczyk, Konrad, et al., "Parametric Spatial Sound Processing: A Flexible and Efficient Solution to Sound Scene Acquisition, Modification, and Reproduction", IEEE Signal Process. Mag., 32(2), pp. 31-42, 2015, pp. 31-42.

Kronlachner, Matthias, et al., "Spatial Transformations for the Enhancement of Ambisonics Recordings", 2nd International Conference on Spatial Audio, Erlangen, Germany, 2014, 5 pp.

(56) References Cited

OTHER PUBLICATIONS

Kuttruff, Heinrich , "Room Acoustics", Taylor & Francis, 4 edition, 2000, 369 pp.
Liitola, Toni , "Headphone sound externalization", Ph.D. thesis, Helsinki University of Technology. Department of Electrical and Communications Engineering Laboratory of Acoustics and Audio Signal Processing., 2006, 83 pp.
Merimaa, Juha , "Analysis, Synthesis and Perception of Spatial Sound: Binaural Localization Modeling and Multichannel Loudspeaker Reproduction", Ph.D. thesis, Helsinki University of Technology, 2006, 196 pp.
Pihlajamaki, Tapani , et al., "Synthesis of Complex Sound Scenes with Transformation of Recorded Spatial Sound in Virtual Reality", JAES, AES, 60 East 42nd Street, Room 2520 New York 10165-2520, USA, vol. 63, No. 7/8, Aug. 18, 2015, pp. 542-551, XP040672137, pp. 542-551.
Pihlajamäki, Tapani , et al., "", Synthesis of Complex Sound Scenes with Transformation of Recorded Spatial Sound in Virtual Reality, Journal of the Audio Engineering Society Papers vol. 63, No. 7/8, Jul./Aug. 2015, Aug. 2015.
Plinge, Axel , et al., "Six-Degrees-of-Freedom Binaural Audio Reproduction of First-Order Ambisonics with Distance Information", Aug. 22, 2018, Conference on Audio for Virtual and Augmented Reality, 10 pp.
Pulkki, Ville , "Directional audio coding in spatial sound reproduction and stereo upmixing", Proc. of the 28th AES International Conference, 2006, 8 pp.
Pulkki, Ville , "Spatial Sound Reproduction with Directional Audio Coding", J. Audio Eng. Soc., 55(6), pp. 503-516, 2007, pp. 503-516.
Pulkki, Ville , "Virtual sound source positioning using vector base amplitude panning", J. Acoust. Soc. A m,, vol. 45, No. 6, pp. 456-466, Jun. 1997, pp. 456-466.
Rummukainen, Olli , et al., "Evaluating Binaural Reproduction Systems from Behavioral Patterns in a Virtual Reality—A Case Study with Impaired Binaural Cues and Tracking Latency", Audio Eng. Soc. Conv. 143, New York, NY, USA, 2017, 8 pp.
Rungta, Atul , et al., "Diffraction Kernels for Interactive Sound Propagation in Dynamic Environments", IEEE Trans. Visualization & Comp. Graphics, 24(4), pp. 1613-1622, 2018, pp. 1613-1622.
Schlecht, Sebastian J, et al., "Sign-Agnostic Matrix Design for Spatial Artificial Reverberation with Feedback Delay Networks", Proc. Audio Eng. Soc. Conf., pp. 1-10—accepted, Tokyo, Japan, 2018, Aug. 6, 2018, pp. 1-10.
Schuijers, Erik , et al., "Low complexity parametric stereo coding", Proc. of the 116th A ES Convention, Berlin, Germany, 2004.
Schuijers, Erik , et al., "Low complexity parametric stereo coding", Proc. of the 116th A ES Convention, Berlin, Germany, 2004, 11 pp.
Tapani, Pihlajamaki , "Synthesis of Complex Sound Scenes with Transformation of Recorded Spatial Sound in Virtual Reality", JAES, AES, 60 East 42nd Street, Room 2520 New York 10165-2520, USA, vol. 63, No. 7/8, Aug. 18, 2015 (Aug. 18, 2015), pp. 542-551, XP040672137, DOI: 10.17743/JAES .2015.0059, p. 542, paragraph 1.-p. 547, paragraph 3.3, pp. 542, 547.
Taylor, Micah , et al., "Guided multi-view ray tracing for fast auralization", IEEE Trans. Visualization & Comp. Graphics, 18, pp. 1797-1810, 2012, pp. 1797-1810.
Thiergart, Oliver , et al., "An Acoustical Zoom based on Informed Spatial Filtering", Int. Workshop on Acoustic Signal Enhancement, pp. 109-113, 2014, pp. 109-113.
Thiergart, Oliver , et al., "Geometry-Based Spatial Sound Acquisition using Distributed Microphone Arrays", IEEE Trans. Audio, Speech, Language Process., 21(12), pp. 2583-2594, 2013, pp. 2583-2594.
Thiergart, Oliver , et al., "Three-Dimensional Sound Field Analysis with Directional Audio Coding Based on Signal Adaptive Parameter Estimators", Audio Eng. Soc. Conv. Spatial Audio: Sense the Sound of Space, 2010, 9 pp.
Tsingos, Nicolas , et al., "Perceptual Audio Rendering of Complex Virtual Environments", ACM Transactions on Graphics, 23(3), pp. 249-258, 2004, pp. 249-258.
Tylka, J. , et al., "Comparison of techniques for binaural navigation of higher order ambisonics sound fields", Proc. of the AES International Conference on Audio for Virtual and Augmented Reality, New York, Sep. 2016.
Tylka, Joseph G, et al., "Performance of Linear Extrapolation Methods of Virtual Sound Field Navigation", J. Audio Eng. Soc., vol. 68, No. 3, Mar. 2020, pp. 138-156.
Tylka, Joseph G, et al., "Soundfield Navigation using an Array of Higher-Order Ambisonics Microphones", Conference: 2016 AES International Conference on Audio for Virtual and Augmented Reality; Sep. 2016, AES, 60 East 42nd Street, Room 2520 New York 10165-2520, USA, Sep. 21, 2016, XP040681032, Sep. 21, 2016, 10 pp.
Tylka, Joseph G., et al., "Soundfield Navigation using an Array of Higher-Order Ambisonics Microphones", Conference: 2016 AES International Conference on Audio for Virtual and Augmented Reality; Sep. 2016, AES, 60 East 42nd Street, Room 2520 New York, 10165-2520, USA, Sep. 21, 2016 (Sep. 21, 2016).
Yang, Cheng , et al., "A 3D Audio Coding Technique Based on Extracting the Distance Parameter", Jul. 18, 2014, 2014 IEEE International Conference on Multimedia and Expo (ICME), 6 pp.
Yulin, Peng , "[Part 1 of 4] Study on Several Algorithms for Three-Dimension Audio", China's outstanding master's academic dissertation full text database (Information Technology), Aug. 15, 2013 (62 pp.), 15 pp.
Yulin, Peng , "[Part 2 of 4] Study on Several Algorithms for Three-Dimension Audio", China's outstanding master's academic dissertation full text database (Information Technology), Aug. 15, 2013 (62 pp.), 16 pp.
Yulin, Peng , "[Part 3 of 4] Study on Several Algorithms for Three-Dimension Audio", China's outstanding master's academic dissertation full text database (Information Technology), Aug. 15, 2013 (62 pp.), 17 pp.
Yulin, Peng , "[Part 4 of 4] Study on Several Algorithms for Three-Dimension Audio", China's outstanding master's academic dissertation full text database (Information Technology), Aug. 15, 2013 (62 pp.), 14 pp.
Zhang, Wen , et al., "Surround by Sound: A Re-view of Spatial Audio Recording and Reproduction", Applied Sciences, 7(5), p. 532, 2017, 532.
Ziegler, Matthias , et al., "Immersive Virtual Reality for Live-Action Video using Camera Arrays", IBC, Amsterdam, Netherlands, 2017, 8 pp.
Tsukada, Manabu, et al., "SDM3602: An interactive audio-visual service for music event", "SDM3602: Interactive playback of free-view-listen point video and audio for music events", Multimedia, Distributed, Cooperative, and Mobile Symposium (DICOMO2017), vol. 2017, No. 1, pp. 1460-1467, 9 pp.

| 1ˢᵗ sound-field description | 2ⁿᵈ sound-field description | information on 1ˢᵗ and 2ⁿᵈ sound fields |

DirAC synthesis

CONCEPT FOR GENERATING AN ENHANCED SOUND FIELD DESCRIPTION OR A MODIFIED SOUND FIELD DESCRIPTION USING A MULTI-POINT SOUND FIELD DESCRIPTION

CROSS-REFERENCES TO RELATED APPLICATIONS

This application is a divisional of copending U.S. patent application Ser. No. 17/898,016 filed Aug. 29, 2022, which is a continuation of U.S. patent application Ser. No. 16/740,272, filed Jan. 10, 2020 (U.S. Pat. No. 11,463,834 issued Oct. 4, 2022), which is incorporated herein by reference in its entirety, which in turn is a continuation of International Application No. PCT/EP2018/069140, filed Jul. 13, 2018, which is incorporated herein by reference in its entirety, and additionally claims priority from European Application No. EP 17 181 488.2, filed Jul. 14, 2017, which is incorporated herein by reference in its entirety.

TECHNICAL FIELD

The present invention is related to audio processing and, particularly, audio processing in relation to sound fields that are defined with respect to a reference location such as a microphone or a virtual microphone location.

BACKGROUND OF THE INVENTION

Ambisonics signals comprise a truncated spherical harmonic decomposition of the sound field. Ambisonics comes in different flavors. There is 'traditional' Ambisonics [31] which today is known as 'First-Order Ambisonics' (FOA) and comprises four signals (i.e., one omnidirectional signal and up to three figure-of-eight directional signals). More recent Ambisonics variants are known as 'Higher-Order Ambisonics' (HOA) and provide enhanced spatial resolution and larger listener sweet-spot area at the expense of carrying more signals. In general, a fully defined N-th order HOA representation consists of $(N+1)^2$ signals.

Related to the Ambisonics idea, the Directional Audio Coding (DirAC) representation has been conceived to represent a FOA or HOA sound scene in a more compact, parametric style. More specifically, the spatial sound scene is represented by one (or more) transmitted audio channels which represent a downmix of the acoustic scene and associated side information of the direction and diffuseness in each time-frequency (TF) bin. More information on DirAC can be found in [32, 33].

DirAC [32] can be used with different microphone systems and with arbitrary loudspeaker setups. The purpose of the DirAC system is to reproduce the spatial impression of an existing acoustical environment as precisely as possible using a multichannel/3D loudspeaker system. Within the chosen environment, responses (continuous sound or impulse responses) arc measured with an omnidirectional microphone (W) and with a set of microphones that enables to measure the direction-of-arrival of sound and the diffuseness of sound. A common method is to apply three figure-of-eight microphones (X, Y, Z) aligned with the corresponding Cartesian coordinate axes [34]. A way to do this is to use a Sound field microphone, which directly yields all the desired responses. The W, X, Y, and Z signals can also be computed from a set of discrete omnidirectional microphones.

In DirAC, the sound signal is first divided into frequency channels. The sound direction and diffuseness is measured depending on time at each frequency channel. In transmission, one or more audio channels are sent, together with analyzed direction and diffuseness data. In synthesis, the audio which is applied to the loudspeakers can be for example the omnidirectional channel W, or the sound for each loudspeaker can be computed as a weighed sum of W, X, Y, and Z, which forms a signal which has a certain directional characteristics for each loudspeaker. Each audio channel is divided into frequency channels, which are then divided optionally to diffuse and to non-diffuse streams depending on analyzed diffuseness. A diffuse stream is reproduced with a technique, which produces a diffuse perception of a sound scene, e.g., the decorrelation techniques used in Binaural Cue Coding [35-37]. Non-diffuse sound is reproduced with a technique which aims to produce a point-like virtual source according to the direction data (e.g. VBAP [38]).

Three techniques for navigation in 6DoF with a limited degree-of-freedom are proposed in [39]. Given a single Ambisonics signal, a single Ambisonics signal is computed using: 1) simulating HOA playback and listener movement within a virtual loudspeaker array, 2) computing and translating along plane-waves, and 3) re-expanding the sound field about the listener.

Furthermore, reference is made to the DirAC technology as described, for example, in the publication "Directional Audio Coding—Perception-Based Reproduction of Spatial Sound", V. Pulkki et al, International Workshop on the Principles and Applications of Spatial Hearing, Nov. 11-13, 2009, Zao, Miyagi, Japan. This reference describes directional audio coding as an example for a reference location related sound field processing particularly as a perceptually motivated technique for spatial audio processing. It has applications in capturing, coding and re-synthesis of spatial sound, in teleconferencing, in directional filtering, and in virtual auditory environments.

Reproduction of sound scenes has often been focusing on loudspeaker setups, as this was the typical reproduction in private, e.g., living room, and professional context, i.e., cinemas. Here, the relation of the scene to the reproduction geometry is static as it accompanies a two-dimensional image that forces the listener to look in the front direction. Subsequently, the spatial relation of the sound and visual objects is defined and fixed at production time.

In virtual reality (VR), the immersion is explicitly achieved by allowing the user to move freely in the scene. Therefore, the user's movement may be tracked and the visual and auditory reproduction may be adjusted to the user's position. Typically, the user is wearing a head-mounted display (HMD) and headphones. For an immersive experience with headphones, the audio has to be binauralized. Binauralization is a simulation of how the human head, ears, and upper torso change the sound of a source depending on its direction and distance. This is achieved by convolution of the signals with head-related transfer functions (HRTFs) for their relative direction [1, 2]. Binauralization also makes the sound appear to be coming from the scene rather than from inside the head [3]. A common scenario that has already been addressed successfully is 360° video reproduction [4, 5]. Here, the user is either wearing an HMD or holding a tablet or phone in his hands. By moving her/his head or the device, the user can look around in any direction. This is a three-degrees-of-freedom (3DoF) scenario, as the user has three movement degrees (pitch, yaw, roll). Visually, this is realized by projecting the video on a sphere around the user. Audio is often recorded with a spatial microphone [6], e.g., first-order Ambisonics (FOA), close to the video camera. In the Ambisonics domain, the user's head rotation is adapted in a straightforward manner [7]. The audio is then for example rendered to virtual loudspeakers placed around the user. These virtual loudspeaker signals are then binauralized.

Modern VR applications allow for six-degrees-of-freedom (6DoF). Additionally to the head rotation, the user can move around resulting in translation of her/his position in three spatial dimensions. The 6DoF reproduction is limited by the overall size of the walking area. In many cases, this area is rather small, e.g., a conventional living room. 6DoF is commonly encountered in VR games. Here, the whole scene is synthetic with computer-generated imagery (CGI). The audio is often generated using object-based rendering where each audio object is rendered with distance-dependent gain and relative direction from the user based on the tracking data. Realism can be enhanced by artificial reverberation and diffraction [8, 9, 10].

Regarding recorded content, there are some distinct challenges for convincing audio-visual 6DoF reproduction. An early example of spatial sound manipulation in the spatial translation domain is that of 'acoustic zoom' techniques [11, 12]. Here, the listener position is virtually moved into the recorded visual scene, similar to zooming into an image. The user chooses one direction or image portion and can then listen to this from a translated point. This entails that all the direction of arrivals (DoAs) are changing relative to the original, non-zoomed reproduction.

Methods for 6DoF reproduction of recorded content have been using spatially distributed recording positions have been proposed. For video, arrays of cameras can be employed to generate light-field rendering [13]. For audio, a similar setup employs distributed microphone arrays or Ambisonics microphones. It has been shown that it is possible to generate the signal of a 'virtual microphone' placed at an arbitrary position from such recordings [14].

In order to realize such spatial sound modifications in a technically convenient way, parametric sound processing or coding techniques can be employed (cf. [15] for an overview). Directional audio coding (DirAC) [16] is a popular method to transform the recording into a representation that consists of an audio spectrum and parametric side information on the sound direction and diffuseness. It is used for acoustic zoom [11] and virtual microphone [14] applications.

The method proposed here enables 6DoF reproduction from the recording of a single FOA microphone. Recordings from a single spatial position have been used for 3DoF reproduction or acoustic zoom. But, to the inventors' knowledge, no method for interactive, fully 6DoF reproduction from such data has been proposed so far. One realizes the 6DoF reproduction by integrating information about the distance of the sound sources in the recording. This distance information is incorporated into the parametric representation of DirAC, such that the changed perspective of the listener is correctly mapped.

None of the Ambisonics sound field representations (be it as regular FOA or HOA Ambisonics or as DirAC-style parametric sound field representation) provide sufficient information to allow a translational shift of the listener's position as it may be used for 6DoF applications since neither object distance nor absolute object positions in the sound scene are determined in these formats. It should be noted that the shift in the listener's position can be translated into an equivalent shift of the sound scene in the opposite direction.

A typical problem when moving in 6DoF is illustrated in FIG. 1b. Let us assume that the sound scene is described at Position A using Ambisonics. In this case sounds from Source A and Source B arrive from the same direction, i.e., they have the same direction-of-arrival (DOA). In case one moves to Position B the DOA of Source A and Source B are different. Using a standard Ambisonics description of the sound field, i.e., without additional information, it is not possible to compute the Ambisonics signals at Position B given the Ambisonics signals at Position A.

SUMMARY

According to an embodiment, an apparatus for generating a modified sound field description may have: an interface configured for receiving a sound field description and meta data relating to spatial information of the sound field description; and a sound field calculator configured for calculating the modified sound field description using the spatial information, the sound field description and a translation information indicating a translation of a reference location to a different reference location.

According to another embodiment, a method of generating a modified sound field description may have the steps of: receiving a sound field description and meta data relating to spatial information of the sound field description; and calculating the modified sound field description using the spatial information, the sound field description and a translation information indicating a translation from a reference location to a different reference location.

Another embodiment may have a non-transitory storage medium having stored thereon a computer program for performing, when running on a computer or a processor, a method of generating a modified sound field description having the steps of: receiving a sound field description and meta data relating to spatial information of the sound field description; and calculating the modified sound field description using the spatial information, the sound field description and a translation information indicating a translation from a reference location to a different reference location.

The present invention is based on the finding that typical sound field descriptions that are related to a reference location need additional information so that these sound field descriptions can be processed so that a modified sound field description that is not related to the original reference location but to another reference location can be calculated. To this end, meta data relating to spatial information of this sound field is generated and the meta data together with the sound field description corresponds to the enhanced sound field description that can, for example, be transmitted or stored. In order to generate a modified sound field description from the sound field description and the meta data and, specifically, the meta data relating to spatial information of the sound field description, the modified sound field is calculated using this spatial information, the sound field description and a translation information indicating a translation from a reference location to a different reference location. Thus, the enhanced sound field description consisting of a sound field description and meta data relating to spatial information of this sound field underlying the sound field description is processed to obtain a modified sound field description that is related to a different reference location defined by additional translation information that can, for example, be provided or used at a decoder-side.

However, the present invention is not only related to an encoder/decoder scenario, but can also be applied in an application where both, the generation of the enhanced sound field description and the generation of the modified sound field description take place on basically one and the same location. The modified sound field description may, for example, be a description of the modified sound field itself or actually the modified sound field in channel signals, binaural signals or, once again, a reference location-related sound field that, however, is now related to the new or different reference location rather than the original reference location. Such an application would, for example, be in a virtual reality scenario where a sound field description together with a meta data exists and where a listener moves out from the reference location to which the sound field is given and moves to a different reference location and where, then, the sound field for the listener moving around in the virtual area is calculated to correspond to the sound field but now at the different reference location where the user has moved to.

In a particular embodiment, the enhanced sound field description has a first sound field description related the (first) reference location and a second sound field description related to a further (the second) reference location which is different from the (first) reference location, and the metadata has information on the reference location and the further reference location such as vectors pointing from a predetermined origin to these reference locations. Alternatively, the metadata can be a single vector pointing to either the reference location or the further reference location and a vector extending between the two reference locations, to which the two different sound field descriptions are related to.

The sound field descriptions can be non-parametric sound field descriptions such as first-order Ambisonics or higher-order Ambisonics descriptions. Alternatively or additionally, the sound field descriptions can be DirAC descriptions or other parametric sound field descriptions, or one sound field description can, for example, be a parametric sound field description and the other sound field description can be, for example, a non-parametric sound field description.

Hence, the sound field description may generate, for each sound field description, a DirAC description of the sound field having one or more downmix signals and individual direction data and optionally diffuseness data for different time-frequency bins. In this context, the metadata generator is configured to generate geometrical metadata for both sound field descriptions so that the reference location and the additional reference location can be identified from the metadata. Then, it will be possible to extract individual sources from both sound field descriptions and to perform an additional processing for the purpose of generating an enhanced or modified sound field description.

Ambisonics has become one of the most commonly used formats for 3D audio in the context of virtual, augmented, and mixed reality applications. A wide variety of audio acquisition and production tools have been developed that generate an output signal in Ambisonics format. To present Ambisonics coded content in interactive virtual reality (VR) applications, the Ambisonics format is converted to a binaural signal or channels for reproduction. In the aforementioned applications, the listener is usually able to interactively change his/her orientation in the presented scene to the extent that he/she can rotate his/her head in the sound scene enabling three-degrees-of-freedom (3DoF, i.e., pitch, yaw, and role) and still experience an appropriate sound quality. This is implemented by rotating the sound scene before rendering according to the head orientation, which can be implemented with low computational complexity and is an advantage of the Ambisonics representation. In emerging applications, such as VR, it is however desired to allow the user free movement in the sound scene rather than only changes of orientation (so-called 'six-degrees-of-freedom' or 6DoF). As a consequence, signal processing may be used to change the perspective of the sound scene (i.e. to virtually move within the sound scene along the x-, y-, or z-axes). However, a major disadvantage of Ambisonics is that the procedure describes the sound field from a single perspective in the sound scene. Specifically, it does not contain information about the actual location of sound sources in the sound scene which would allow to shift the sound scene ('translation') as it may be used for 6DoF. This invention description provides several extensions of Ambisonics to overcome this problem and facilitate also the translation, and hence enable true 6DoF.

First-order Ambisonics (FOA) recordings can be processed and reproduced over headphones. They can be rotated to account for the listeners head orientation. However, virtual reality (VR) systems allow the listener to move in six-degrees-of-freedom (6DoF), i.e., three rotational plus three transitional degrees of freedom. Here, the apparent angles and distances of the sound sources depend on the listener's position. A technique to facilitate 6DoF is described. In particular, a FOA recording is described using a parametric model, which is modified based on the listener's position and information about the distances to the sources. The method is evaluated by a listening test, comparing different binaural renderings of a synthetic sound scene in which the listener can move freely.

In further embodiments, the enhanced sound field description is output by an output interface for generating an output signal for transmission or storage, where the output signal comprises, for a time frame, one or more audio signals derived from the sound field and the spatial information for the time frame. Particularly, the sound field generator is in further embodiments adaptive to derive direction data from the sound field, the direction data referring to a direction of arrival of sound for a time period or a frequency bin and the meta data generator is configured to derive the spatial information as data items associating a distance information to the direction data.

Particularly, in such an embodiment, an output interface is configured to generate the output signals so that the data items for the time frame are linked to the direction data for the different frequency bins.

In a further embodiment, the sound field generator is also configured to generate a diffuseness information for a plurality of frequency bins of a time frame of the sound field, wherein the meta data generator is configured to only generate a distance information for a frequency bin being different from a predetermined value, or being different from infinity or to generate a distance value for the frequency bin at all, when the diffuseness value is lower than a predetermined or adaptive threshold. Thus, for time/frequency bins that have a high diffuseness, any distance value is not generated at all or a predetermined distance value is generated that is interpreted by a decoder in a certain way. Thus, it is made sure that for time/frequency bins having a high diffuseness, any distance-related rendering is not performed, since a high diffuseness indicates that, for such a time/frequency bin, the sound does not come from a certain localized source but comes from any direction and, therefore, is the same irrespective of whether the sound field is perceived at the original reference location or the different or new reference location.

With respect to the sound field calculator, embodiments comprise a translation interface for providing the translation information or rotation information indicating a rotation of an intended listener to the modified sound field, a meta data supplier for supplying the meta data to the sound field calculator and a sound field supplier for supplying the sound field description to the sound field calculator and, additionally, an output interface for outputting the modified sound field comprising the modified sound field description and modified meta data, the modified meta data being derived from the meta data using the translation information, or the output interface outputs a plurality of loudspeaker channels, each loudspeaker channel being related a predefined loudspeaker position, or the output interface outputs a binaural representation of the modified sound field.

In an embodiment, the sound field description comprises a plurality of sound field components. The plurality of sound field components comprise an omnidirectional component and at least one directional component. Such a sound field description is, for example, a first-order Ambisonics sound field description having an omnidirectional component and three directional components X, Y, Z or such a sound field is a higher-order Ambisonics description comprising the omnidirectional component, the three directional components with respect to the X, Y, and Z directions and, additionally, further directional components that relate to other directions than the X, Y, Z directions.

In an embodiment, the apparatus comprises an analyzer for analyzing the sound field components to derive, for different time or frequency bins, direction of arrival information. The apparatus additionally has a translation transformer for calculating modified DoA information per frequency or time bin using the DoA information and the meta data, where the meta data relate to a depth map associating a distance to a source included in both sound field descriptions as obtained by for example triangulation processing using two angles with respect to two different reference locations and the distance/positions or the reference locations. This may apply to a fullband representation or to different frequency bins of a time frame.

Furthermore, the sound field calculator has a distance compensator for calculating the modified sound field using a distance compensation information depending from the distance calculated using the meta data being the same for each frequency or time bin of a source of being different for each or some of the time/frequency bins, and from a new distance associated with the time or frequency bin, the new distance being related to the modified DoA information.

In an embodiment, the sound field calculator calculates a first vector pointing from the reference location to a sound source obtained by an analysis of the sound field. Furthermore, the sound field calculator calculates a second vector pointing from the different reference location to the sound source and this calculation is done using the first vector and the translation information, where the translation information defines a translation vector from the reference location to the different reference location. And, then, a distance from the different reference location to the sound source is calculated using the second vector.

Furthermore, the sound field calculator is configured to receive, in addition to the translation information, a rotation information indicating a rotation of the listener's head in one of the three rotation directions given by pitch, yaw and roll. The sound field calculator is then configured to perform the rotation transformation to rotate a modified direction of arrival data for a sound field using the rotation information, where the modified direction of arrival data is derived from a direction of arrival data obtained by a sound analysis of the sound field description and the translation information.

In an embodiment, the sound field calculator is configured to determine source signals from the sound field description and directions of the source signals related to the reference location by a sound analysis.

Then, new directions of the sound sources are calculated that are related to the different reference location and this is done using the meta data, and then distance information of the sound sources related to the different reference location is calculated and, then, the modified sound field is synthesized using the distance information and the new directions of the sound sources.

In an embodiment, a sound field synthesis is performed by panning the sound source signals to a direction given by the new direction information in relation to a reproduction setup, and a scaling of the sound source signals is done using the distance information before performing the panning operation or subsequent to performing the panning operation.

In a further embodiment, a diffuse part of the sound source signal is added to a direct part of the sound source signal, the direct part being modified by the distance information before being added to the diffuse part.

Particularly, it is advantageous to perform the sound source synthesis in a spectral representation where the new direction information is calculated for each frequency bin, where the distance information is calculated for each frequency bin, and where a direct synthesis for each frequency bin using the audio signal for the frequency bin is performed using an audio signal for the frequency bin, a panning gain for the frequency bin derived from the new direction information and a scaling factor for the frequency bin derived from the distance information for the frequency bin is performed.

Furthermore, a diffuse synthesis is performed using a diffuse audio signal derived from the audio signal from the frequency bin and using a diffuseness parameter derived by the signal analysis for the frequency bin and, then, the direct signal and the diffuse signal are combined to obtain a synthesized audio signal for the time or frequency bin and, then, a frequency-time conversion is performed using audio signals for other time/frequency bins to obtain a time domain synthesized audio signal as the modified sound field.

Therefore, in general, the sound field calculator is configured to synthesize, for each sound source, a sound field related to the different reference location by, for example, processing, for each source, a source signal using the new direction for the source signal to obtain a sound field description of the source signal related to the different/new reference location. Furthermore, the source signal is modified before processing the source signal or subsequent to processing the source signal using the direction information. And, finally, the sound field descriptions for the sources are added together to obtain the modified sound field related to the different reference location.

In further embodiments, and, particularly, for generating a modified sound field description from the sound field description and metadata relating to spatial information of the sound field description, the sound field calculator calculates the modified sound field using the spatial information on the first sound field description, using the spatial information on the second sound field description, and using the translation information indicating a translation of a reference location to a different reference location. Particularly, the metadata may, for example, be a vector directed to the reference location of the sound field description and another vector directed from the same origin to the further reference location of the second sound field description.

In order to address a translation information, objects are generated by applying a source separation, or beamforming, or, generally, any kind of sound source analysis to the first and the second sound field description. Then, the direction of arrival information of all objects irrespective of whether these objects are broadband objects or objects for individual time/frequency bins are computed. Then, the objects extracted from the different sound field descriptions are matched with each other in order to find at least one matched object, i.e., an object occurring both in the first and the second sound field descriptions. This matching is performed, for example, by means of a correlation or coherence calculation using the object signals and/or direction of arrival information or other information.

Thus, the result of the procedure is that there does exist, for a matched object, a first DoA information related to the reference location and the second DoA information related to the further reference location. Then, the positions of the matched objects and, particularly, the distance of the matched object to the reference location or the further reference location is calculated based on triangulation using the information on the reference location or the reference location included in the associated metadata.

This information, and, particularly, the position information for the matched object is then used for modifying each matched object based on the estimated position and the desired position, i.e., after translation, using a distance compensation processing. In order to calculate the new DoA information for the new listener position, the old DoA information from both reference locations and the translation information is used. Basically, this processing can be performed for both individual sound field descriptions, since each matched object occurs in both sound field descriptions. However, in accordance with embodiments, the sound field description having a reference location being closest to the new listener position subsequent to the translation is used.

Then, the new DoA is used for calculating a new sound field description for the matched object related to the different reference location, i.e., to which the user has moved. Then, and in order to also incorporate the non-matched objects, sound field descriptions for those objects are calculated as well but using the old DoA information. And, finally, the modified sound field is generated by adding all individual sound field descriptions together.

Any change with orientation can be realized by applying a single rotation to the virtual Ambisonics signal.

Thus, the metadata is not used for directly providing the distance of an object to a reference location. Instead, the metadata is provided for identifying the reference location of each of two or more sound field descriptions and the distance between a reference location and a certain matched object is calculated based on, for example, triangulation processing steps.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
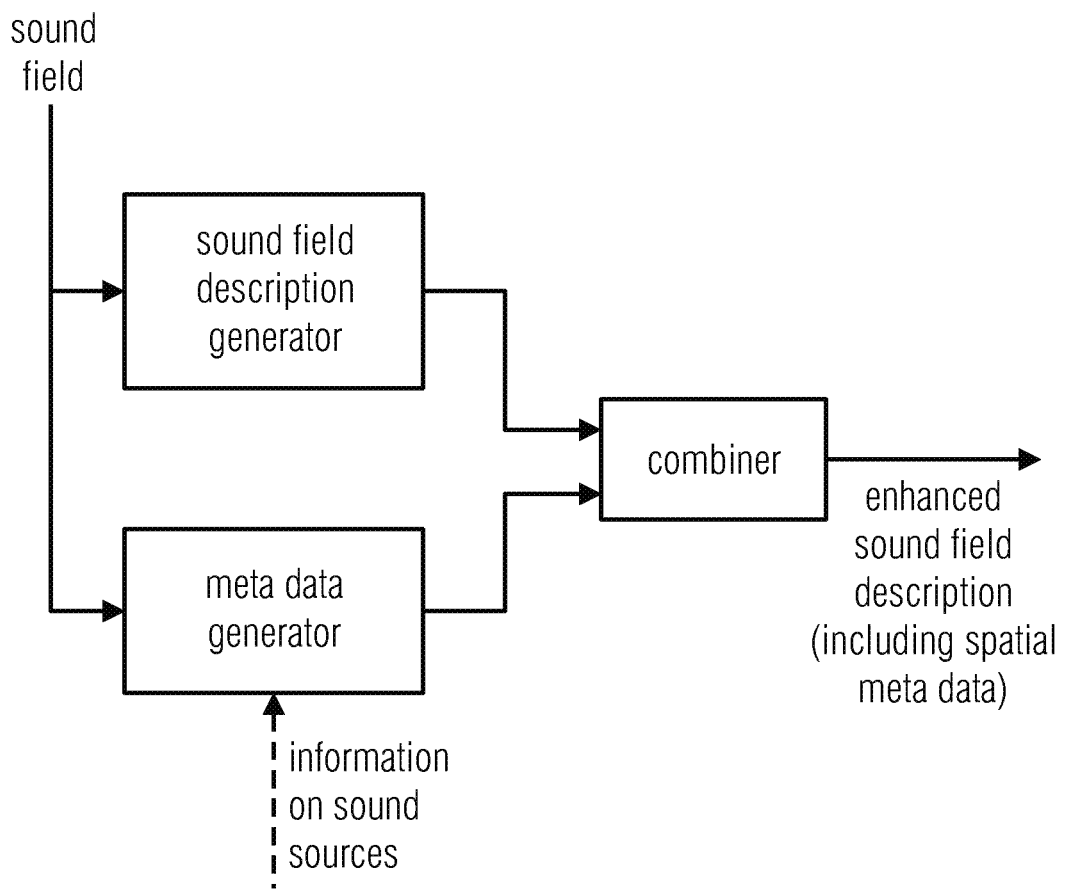
FIG. 1a is an embodiment of an apparatus for generating an enhanced sound field description.

To enable 6DoF applications for the mentioned Ambisonics/DirAC representations, these representations may be extended in a way that provides the missing information for translational processing. It is noted that this extension could, e.g., 1) add the distance or positions of the objects to the existing scene representation, and/or 2) add information that would facilitate the process of separating the individual objects.

It is furthermore an objective of embodiments to preserve/re-use the structure of the existing (non-parametric or parametric) Ambisonics systems to provide backward compatibility with these representations/systems in the sense that the extended representations can be converted into the existing non-extended ones (e.g. for rendering), and allow re-use of existing software and hardware implementations when working with the extended representation.

In the following, several approaches are described, namely one limited (but very simple) approach and three different extended Ambisonics formats to enable 6DoF.

The sound scene is described using two or more Ambisonics signals each describing the sound scene at a different position, or in other words from a different perspective. It is assumed that the relative positions are known. A modified Ambisonics signal at a desired position in the sound scene is generate from the input Ambisonics signals. A signal-based or parametric-based approach can be used to generate a virtual Ambisonics signal at the desired position.

The concept of multi-point Ambisonics representation is applicable for both traditional and parametric (DirAC-style) Ambisonics.

A virtual Ambisonics signal at a desired position (i.e., after translation) is computed using the following steps in a signal-based translation embodiment:
1. Objects are generated by applying source separation to each traditional Ambisonics signal.
2. The DOA of all objects are computed for each traditional Ambisonics signal.
3. The objects extracted from one traditional Ambisonics signal are matched to the objects extracted from the other traditional Ambisonics signals. The matching is performed based on the corresponding DOAs and/or the signals (e.g., by means of correlation/coherence).
4. The positions of the matched objects are estimated based on triangulation.
5. Each matched object (single-channel input) is modified based on the estimated position and the desired position (i.e., after translation) using a distance compensation filter.
6. The DOA at the desired position (i.e., after translation) is computed for each matched object. This DOA is represented by DOA'.
7. An Ambisonics object signal is computed for each matched object. The Ambisonics object signal is generated such that the matched object has a direction-of-arrival DOA'.
8. An Ambisonics object signal is computed for each non-matched object. The Ambisonics object signal is generated such that the non-matched object has a direction-of-arrival DOA.
9. The virtual Ambisonics signal is obtained by adding all Ambisonics object signals together.

A virtual Ambisonics signal at a desired position (i.e., after translation) is computed using the following steps in a parametric-based translation embodiment in accordance with a further embodiment:
1. A sound field model is assumed. The sound field can be decomposed into one or more direct sound components and diffuse sound components. The direct sound components consist of a signal and position information (e.g., in polar or Cartesian coordinates). Alternatively, the sound field can be decomposed into one or more direct/principle sound components and a residual sound component (single- or multi-channel).
2. The signal components and parameters of the assumed sound field model are estimated using the input Ambisonics signals.
3. The signal components and/or parameters are modified depending on the desired translation, or desired position, in the sound scene.
4. The virtual Ambisonics signal is generated using the modified signal components and modified parameters.

Generating multi-point Ambisonics signals is simple for computer-generated and produced content as well as in the context of natural recording via microphone arrays or spatial microphones (e.g., B-format microphone). In the embodiment, it is advantageous to perform a source matching subsequent to step 2 or a triangulation calculation before step 3.

Furthermore, one or more steps of both embodiments can also be used in the corresponding other embodiments.

A change in orientation can be realized by applying a single rotation to the virtual Ambisonics signal.

FIG. 1a illustrates an apparatus for generating an enhanced sound field description comprising a sound field (description) generator 100 for generating at least one sound field description indicating a sound field with respect to at least one reference location.

Furthermore, the apparatus comprises a meta data generator 110 for generating meta data relating to spatial information of the sound field. The meta data receives, as an input, the sound field or alternatively or additionally, separate information on sound sources.

Both, the output of the sound field description generator 100 and the meta data generator 110 constitute the enhanced sound field description. In an embodiment, both, the output of the sound field description generator 100 and the meta data generator 110 can be combined within a combiner 120 or output interface 120 to obtain the enhanced sound field description that includes the spatial meta data or spatial information of the sound field as generated by the meta data generator 110.

Figure 1B:
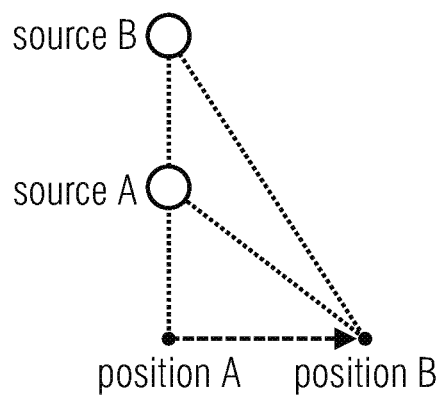
FIG. 1b is an illustration explaining an exemplary problem underlying the present invention.

FIG. 1b illustrates the situation that is addressed by the present invention. The position A, for example, is the at least one reference location and a sound field is generated by source A and source B and a certain actual or, for example, virtual microphone being located at the position A detects the sound from source A and source B. The sound is a superposition of the sound coming from the emitting sound sources. This represents the sound field description as generated by the sound field description generator.

Additionally, the meta data generator would, by certain implementations derive a spatial information with respect to source A and another spatial information with respect to source B such as the distances of these sources to the reference position such as position A.

Naturally, the reference position could, alternatively, be position B. Then, the actual or virtual microphone would be placed at position B and the sound field description would be a sound field, for example, represented by the first-order Ambisonics components or higher-order Ambisonics components or any other sound components having the potential to describe a sound field with respect to at least one reference location, i.e., position B.

The meta data generator might, then, generate, as the information on the sound sources, the distance of sound source A to position B or the distance of source B to position B. Alternative information on sound sources could, of course, be the absolute or relative position with respect to a reference position. The reference position could be the origin of a general coordinate system or could be located in a defined relation to the origin of a general coordinate system.

Other meta data could be the absolute position of one sound source and the relative position of another sound source with respect to the first sound source and so on.

Figure 2:
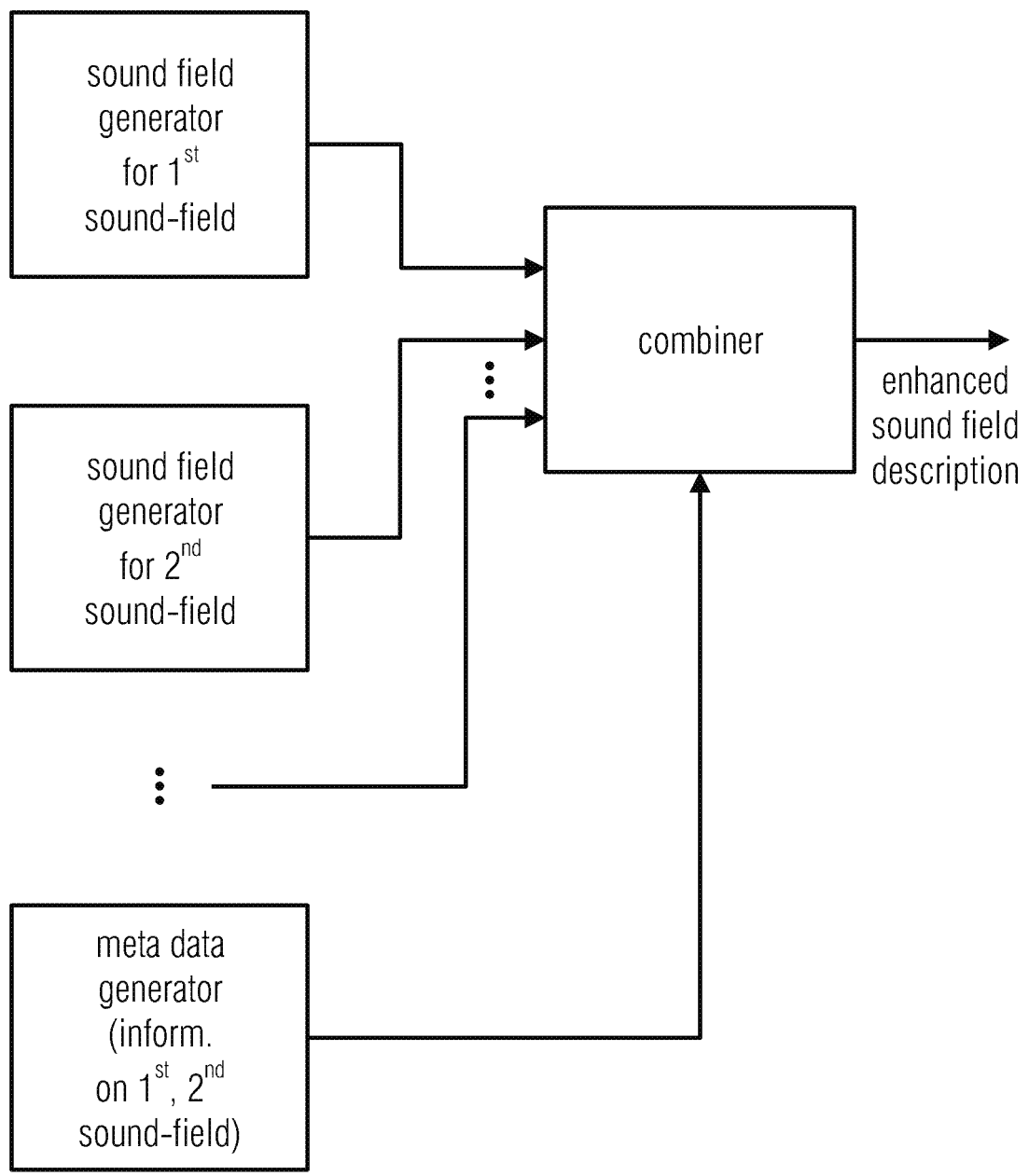
FIG. 2 is an implementation of the apparatus for generating an enhanced sound field description.

FIG. 2 illustrates an apparatus for generating an enhanced sound field description, where the sound field generator comprises a sound field generator 250 for the first sound field, a sound field generator 260 for the second sound field and, an arbitrary number of sound field generators for one or more sound fields such as a third, fourth and so on sound field. Additionally, the metadata is configured to calculate and forward to the combiner 120 an information on the first sound field and the second sound field. All this information is used by the combiner 120 in order to generate the enhanced sound field description. Thus, the combiner 120 is also configured as an output interface to generate the enhanced sound field description.

Figures 3A, 3B:
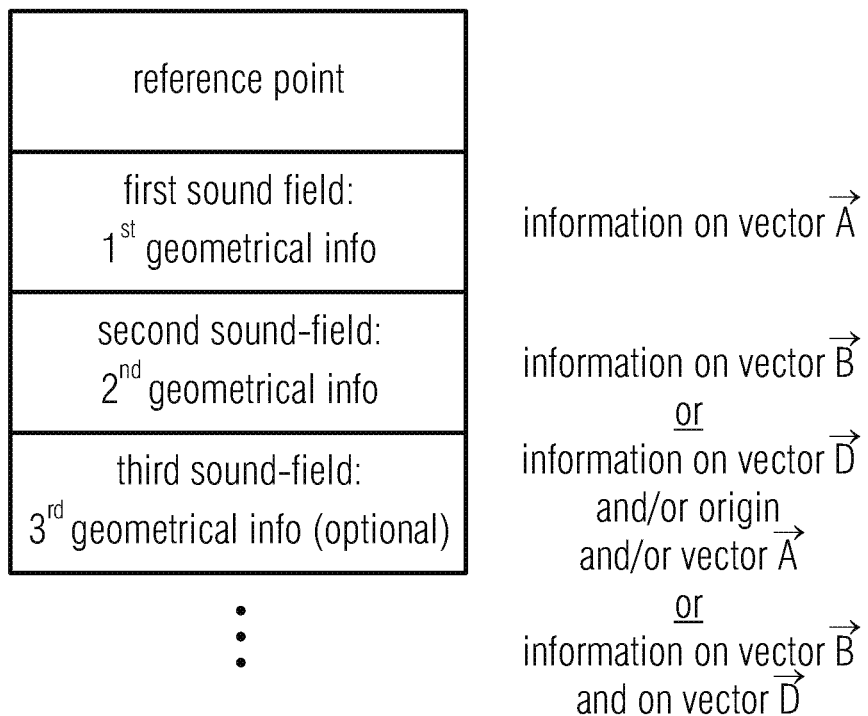
FIG. 3a illustrates the enhanced sound field description comprising audio data, and side information for audio data.
FIG. 3b illustrates a further illustration of an enhanced sound field comprising audio data and meta data relating to spatial information such as geometrical information for each sound field description.

FIG. 3*a* illustrates an enhanced sound field description as a datastream comprising a first sound field description 330, a second sound field description 340 and, associated thereto, the metadata 350 comprising information on the first sound field description and the second sound field description. The first sound field description can, for example, be a B-format description or a higher-order description or any other description that allows to determine a directional distribution of sound sources either in a full-band representation or in a frequency-selected representation. Thus, the first sound field description 330 and the second sound field description 340 can, for example, also be parametric sound field descriptions for the different reference locations having a, for example, a downmix signal and directional of arrival data for different time/frequency bins.

Nevertheless, the geometrical information 350 for the first and the second sound field descriptions is the same for all sources included in the first sound field description 330 or, for the sources in the second sound field description 340, respectively. Thus, when, exemplarily there does exist three sources in the first sound field description 330 and a geometrical information on the first sound field description then this geometrical information is the same for the three sources in the first sound field description. Analogously, when there, for example, exists five sources in the second sound field description, then the geometrical information for the second sound field included in the metadata 350 is the same for all the sources in the second sound field description.

FIG. 3*b* illustrates an exemplary construction of the metadata 350 of FIG. 3*a*. In an embodiment, the reference location 351 can be included in the metadata. However, this is not necessarily the case in the reference location information 351 can also be omitted.

Figure 4A:
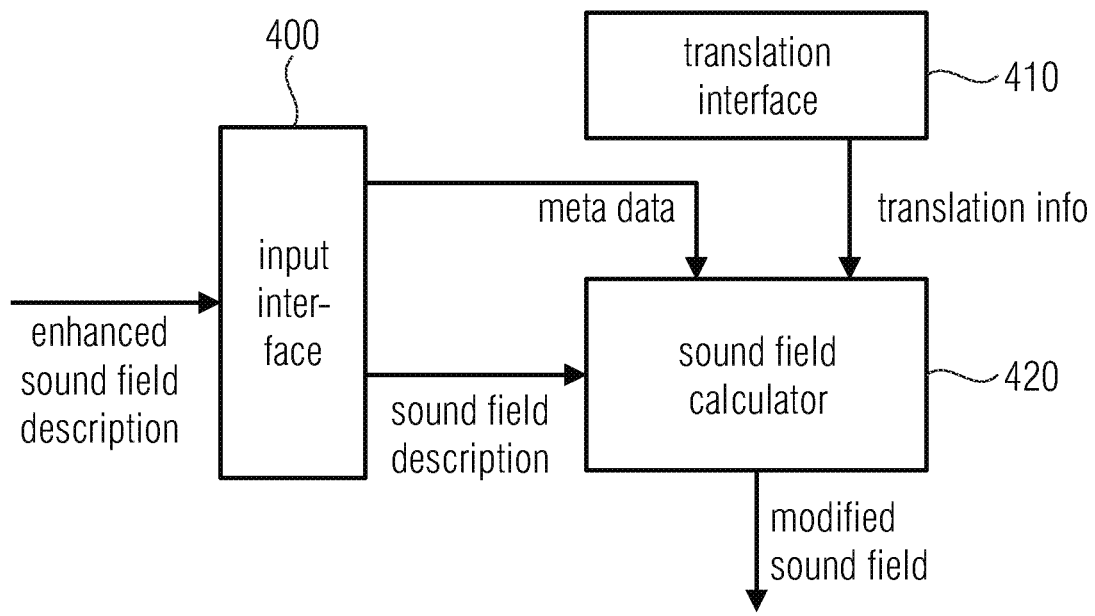
FIG. 4a illustrates an implementation of an apparatus for generating a modified sound field description.
Figure 4B:
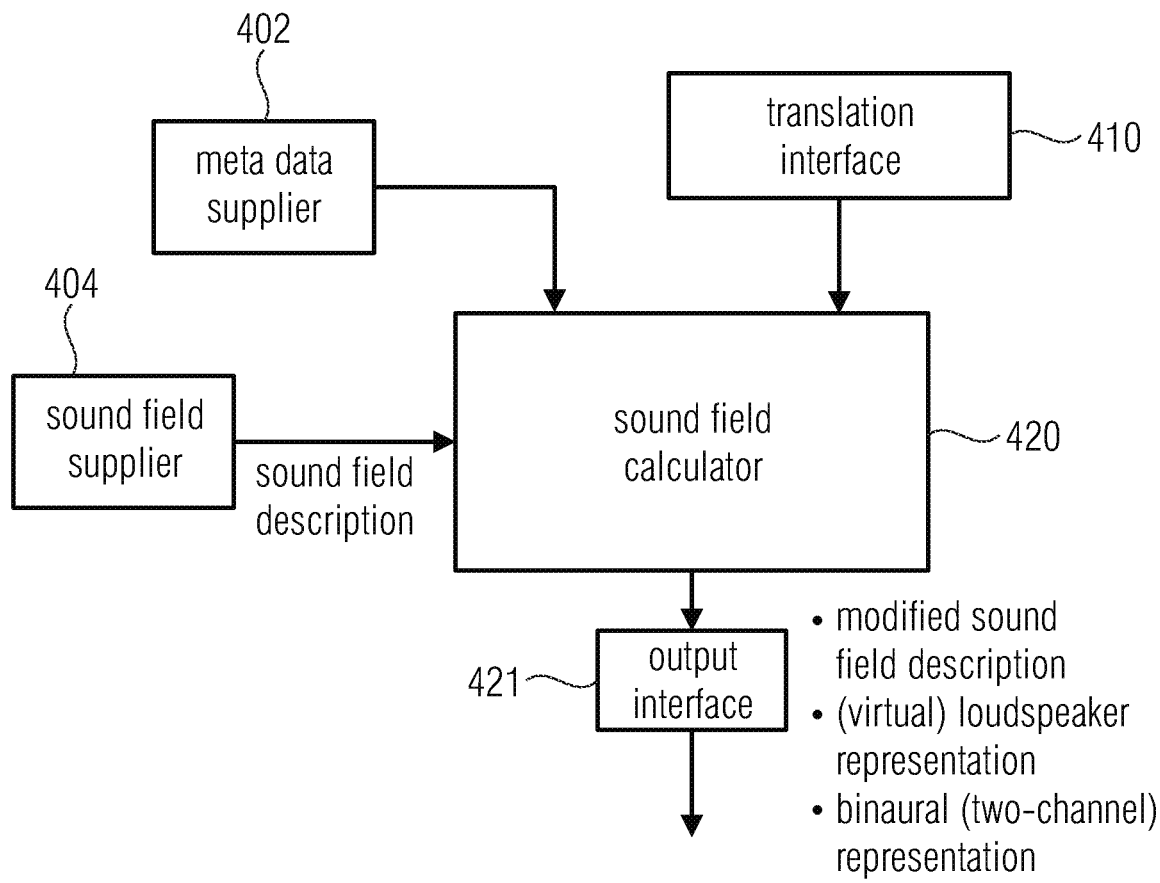
FIG. 4b illustrates a further implementation of an apparatus for generating a modified sound field description.
Figure 4C:
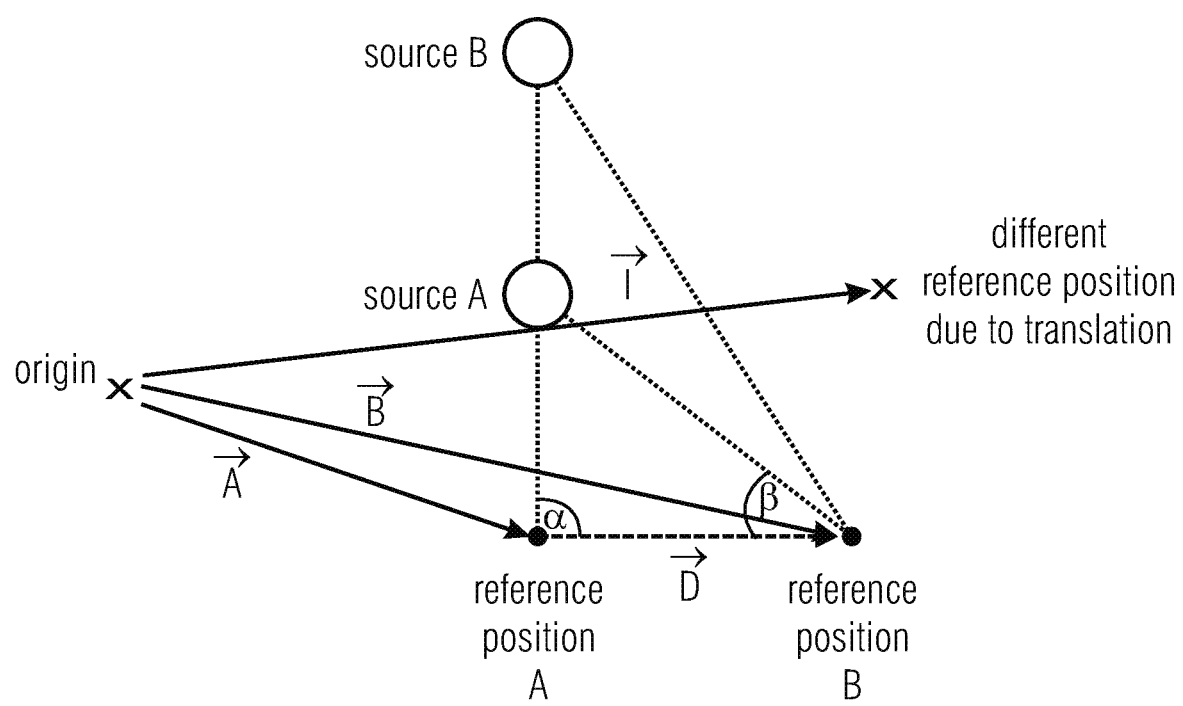
FIG. 4c illustrates a scenario with a reference position/location A, a further reference position/location B, and a different reference location due to translation.

For the first sound field, a first geometrical information is given which can, for example, be an information on vector A illustrated in FIG. 4*c* pointing from an origin to the reference position/location A, to which the first sound field is related.

The second geometrical information can, for example, be an information on the vector B pointing from the origin to the second reference position/location B, to which the second sound field description is related.

A and B are the reference locations or recording positions for both sound field descriptions.

Alternative geometrical information can, for example, be an information on the vector D extending between reference location A and the further reference location B and/or an origin and a vector pointing from the origin to one of both points. Thus, the geometrical information included in the metadata may comprise vector A and vector D or may comprise vector B and vector D or may comprise vector A and vector B without vector D or may comprise other information, from which the reference location A and the reference location B can be identified in a certain three-dimensional coordinate system. However, the same consideration is additionally apply for a two-dimensional sound description as well as particularly illustrated in FIG. 4*c* that only shows the two-dimensional case.

FIG. 4*a* illustrates an implementation of an apparatus for generating a modified sound field description from a sound field description and meta data relating to spatial information of the sound field description. Particularly, the apparatus comprises a sound field calculator 420 that generates the modified sound field using meta data, the sound field description and translation information indicating a translation from a reference location to a different reference location.

In an embodiment, the sound field calculator 420 is connected to an input interface 400 for receiving the enhanced sound field description as, for example, discussed with respect to FIG. 1*a* or 2 and the input interface 400 then separates the sound field description on the one hand, i.e., what has been generated by block 100 of FIG. 1*a* or block 210 of FIG. 2. Furthermore, the input interface 400 separates the meta data from the enhanced sound field description, i.e., item 350 of FIG. 3*a* or optional 351 and 352 to 354 of FIG. 3*b*.

Furthermore, a translation interface 410 obtains the translation information and/or additional or separate rotation information from a listener. An implementation of the translation interface 410 can be a head-tracking unit that not only tracks the rotation of a head in a virtual reality environment, but also a translation of the head from one position, i.e., position A in FIG. 1*b* to another position, i.e., position B in FIG. 1*b*.

FIG. 4*b* illustrates another implementation similar to FIG. 1*a*, but not related to an encoder/decoder scenario, but related to a general scenario where the meta data supply indicated by a meta data supplier 402, the sound field supply indicated by a sound field supplier 404 are done without a certain input interface separating an encoded or enhanced sound field description, but are all done, for example, in an actual scenario existing, for example, in a virtual reality application. However, the present invention is not limited to virtual reality applications, but can also be implemented in any other applications, where the spatial audio processing of sound fields that are related to a reference location is useful in order to transform a sound field related to a first reference location to another sound field related to a different second reference location.

The sound field calculator 420 then generates the modified sound field description or, alternatively, generates a (virtual) loudspeaker representation or generates a binaural representation such as a two-channel representation for a headphone reproduction. Thus, the sound field calculator 420 can generate, as the modified sound field, a modified sound field description, being basically the same as the original sound field description, but now with respect to a new reference position. In an alternative embodiment, a virtual or actual loudspeaker representation can be generated for a predetermined loudspeaker setup such as 5.1 scheme or a loudspeaker setup having more loudspeakers and, particularly, having a three-dimensional arrangement of loudspeakers rather than only a two-dimensional arrangement, i.e., a loudspeaker arrangement having loudspeakers being elevated with respect to the user position. Other applications that are specifically useful for virtual reality applications are applications for binaural reproduction, i.e., for a headphone that can be applied to the virtual reality user's head.

Exemplarily, the subsequently described FIG. 6 illustrates a situation, where a DirAC synthesizer only operates on a downmix component such as the omnidirectional or pressure component, while, in a further alternative embodiment illustrated with respect to FIG. 12*b*, the DirAC synthesizer operates on the whole sound field data, i.e., the full component representation having, in this embodiment in FIG. 12b, a field description with an omnidirectional component w and three directional components x, y, z.

FIG. 4c illustrates the scenario underlying embodiments of the present invention. The Figure illustrates a first reference position/location A, a second reference position/location B and two different sound sources A and B, and a translation vector I.

Both sound sources A and B are included in the sound field description related to reference location A and the second sound field description related to reference position B.

In order to calculate the distance of source A, for example, to the first reference position or to the second reference position, both the different sound field descriptions related to A and B are subjected to a source separation procedure and, then, a matching of the sources obtained by these different sound separation procedures is obtained. This will result in source A, for example. Source A is found in the source separation algorithm for the first sound field description and also for the second sound field description. The direction of arrival information for source A will be, when obtained from the first sound field description related to reference position A the angle α. Additionally, the direction of arrival information for the same source A but now obtained from the second sound field description related to the further reference position B will be angle β.

Now, based on the known or calculable distance D that is, for example, obtainable or calculable from the metadata for the sound field descriptions, and based on the two angles α and β, the triangle defined by source A, the reference position A and the reference position B is fully defined. Thus, the distance from source A to reference position A or the distance from source A to reference position B or the general position of source A, i.e., the vector pointing from the origin to the actual position of source A can be calculated, for example by triangulation processing operations. The position or distance both represent information on a distance or on a position.

The same procedure can then be performed for each matched source, i.e., also for source B.

Thus, a distance/position information for each matched source is calculated and, then, each matched source can be processed as if the distance/position is fully known or is, for example, given by additional metadata. However, only the geometrical information for the first sound field description and the second sound field description may be used instead of any distance/depth information for each individual source.

Figure 8:
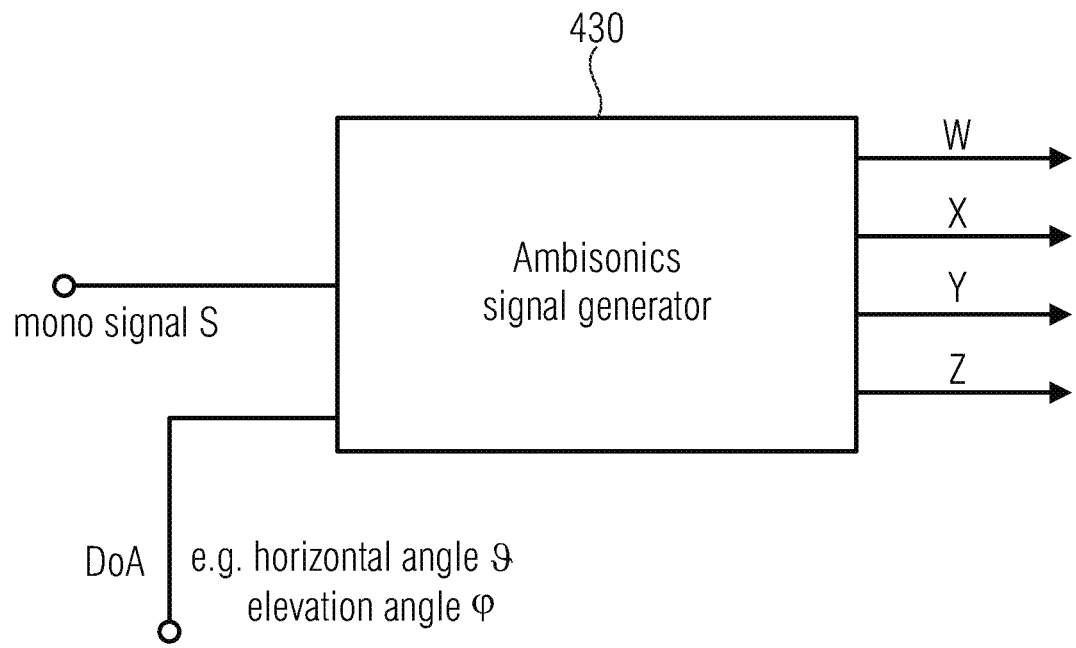
FIG. 8 illustrates an exemplary device for generating a sound field description from an audio signal such a monosignal and direction of arrival data.

FIG. 8 illustrates another implementation for performing a synthesis different from the DirAC synthesizer. When, for example, a sound field analyzer generates, for each source signal, a separate mono signal S and an original direction of arrival and when, depending on the translation information, a new direction of arrival is calculated, then the Ambisonics signal generator 430 of FIG. 8, for example, would be used to generate a sound field description for the sound source signal, i.e., the mono signal S but for the new direction of arrival (DoA) data consisting of a horizontal angle θ or an elevation angle θ and an azimuth angle (p. Then, a procedure performed by the sound field calculator 420 of FIG. 4b would be to generate, for example, a first-order Ambisonics sound field representation for each sound source with the new direction of arrival and, then, a further modification per sound source could be performed using a scaling factor depending on the distance of the sound field to the new reference location and, then, all the sound fields from the individual sources could superposed to each other to finally obtain the modified sound field, once again, in, for example, an Ambisonics representation related to a certain new reference location.

When one interprets that each time/frequency bin processed by a DirAC analyzer 422, 422a, 422b of FIG. 6 represents a certain (bandwidth limited) sound source, then the Ambisonics signal generator 430 could be used, instead of the DirAC synthesizer 425, 425a, 425b to generate, for each time/frequency bin, a full Ambisonics representation using the downmix signal or pressure signal or omnidirectional component for this time/frequency bin as the "mono signal S" of FIG. 8. Then, an individual frequency-time conversion in frequency-time converter for each of the W, X, Y, Z component would then result in a sound field description different from what is illustrated in FIG. 4c.

The scene is recorded from the point of view (PoV) of the microphone, which position is used as the origin of the reference coordinate system. The scene has to be reproduced from the PoV of the listener, who is tracked in 6DoF, cf. FIG. 5. A single sound source is shown here for illustration, the relation holds for each time-frequency bin.

Figure 5:
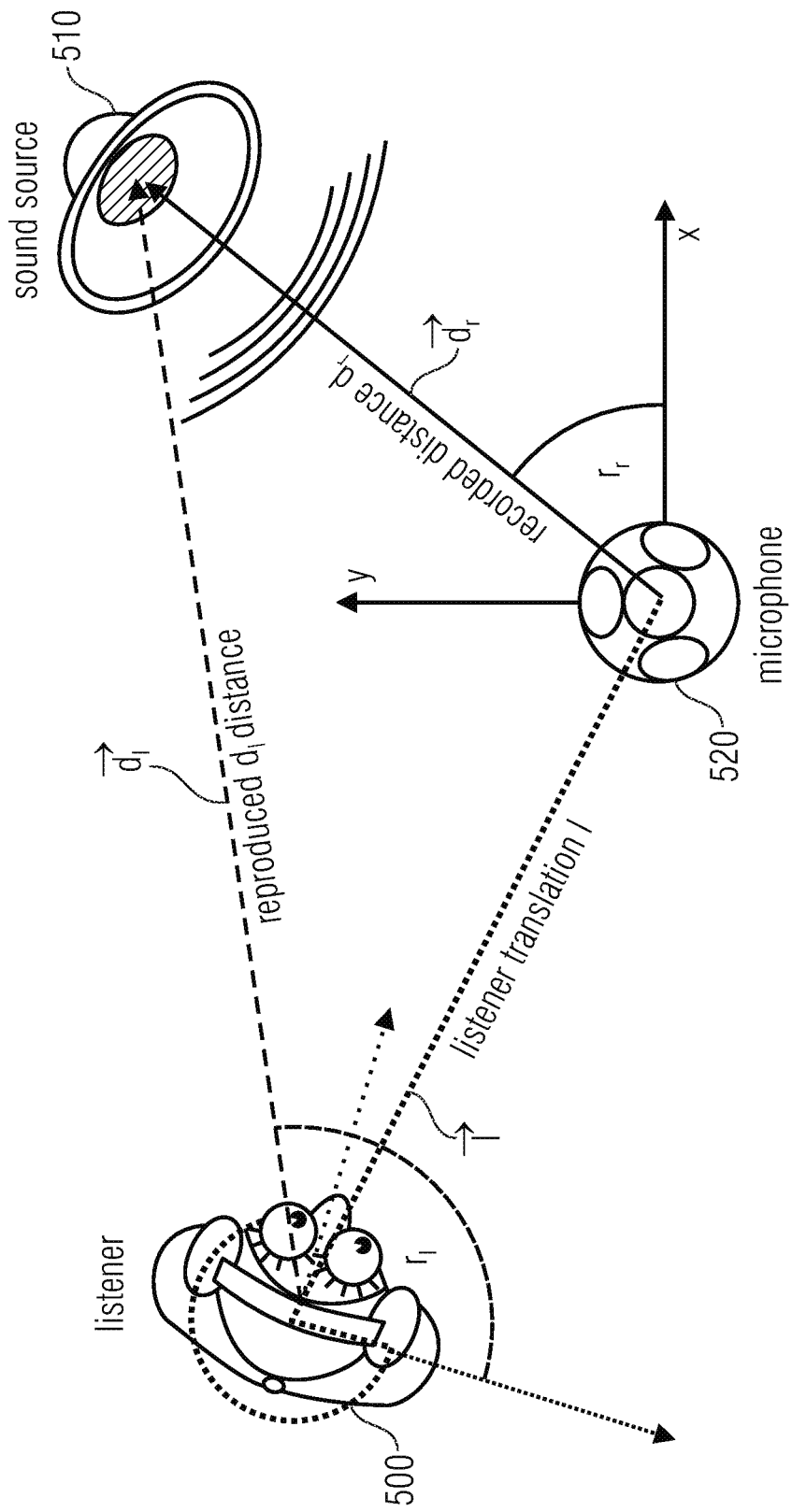
FIG. 5 illustrates the 6DoF reproduction of spatial audio in a general sense.

FIG. 5 illustrates the 6DoF reproduction of spatial audio. A sound source is recorded by a microphone with the DoA $r_r$ in the distance $d_r$ relative to the microphones position and orientation (black line and arc). It has to be reproduced relative to the moving listener with the DoA $r_l$ and distance $d_l$ (dashed). This has to consider the listeners translation l and rotation o (dotted). The DOA is represented as a vector with unit length pointing towards the source.

The sound source at the coordinates $d_r \in \mathbb{R}^3$ is recorded from the direction of arrival (DoA) expressed by the unit vector $r_r = d_r / \|d_r\|$ This DoA can be estimated from analysis of the recording. It is coming from the distance $d_r = \|d_r\|$. It is assumed that this information can be derived from the meta data for each source or, generally, from the item 352, 353, 354 of FIG. 3b, and can be represented as distance description having any direction r from the recording position to the distance (e.g. given in meters or so) as obtained by for example triangulation processing using two angles with respect to two different reference locations and the distance/positions or the reference locations.

The listener is tracked in 6DoF. At a given time, he is at a position $l \in \mathbb{R}^3$ relative to the microphone and has a rotation $o \in \mathbb{R}^3$ relative to the microphones' coordinates system. The recording position is chosen as the origin of the coordinate system to simplify the notation.

Thus the sound has to be reproduced with a different distance $d_1$, leading to a changed volume, and a different DoA $r_1$ that is the result of both translation and subsequent rotation.

A method for obtaining a virtual signal from the listeners perspective by dedicated transformations based on a parametric representation, as explained in the following section, is outlined.

The proposed method is based on the basic DirAC approach for parametric spatial sound encoding cf. [16]. It is assumed that there is one dominant direct source per time-frequency instance of the analyzed spectrum and these can be treated independently. The recording is transformed into a time-frequency representation using short time Fourier transform (STFT). The time frame index is denoted with n and the frequency index with k. The transformed recording is then analyzed, estimating directions $r_r$ (k, n) and diffuseness ψ (k, n) for each time-frequency bin of the complex spectrum P (k, n). In the synthesis, the signal is divided into a direct and diffuse part. Here, loudspeaker signals are computed by panning the direct part depending on the speaker positions and adding the diffuse part.

Figure 6A:
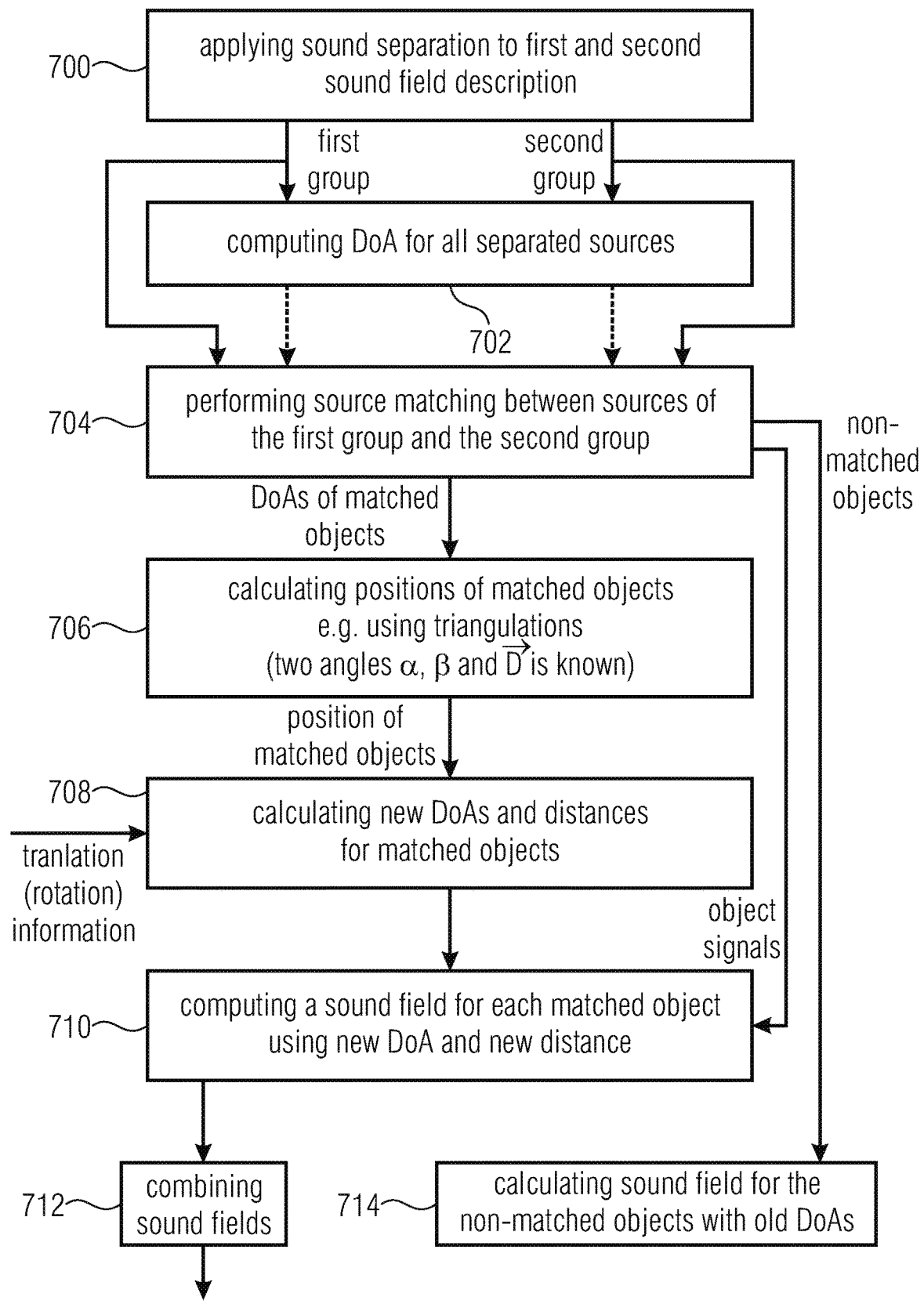
FIG. 6a illustrates an embodiment for the implementation of a sound field calculator.
Figure 6B:
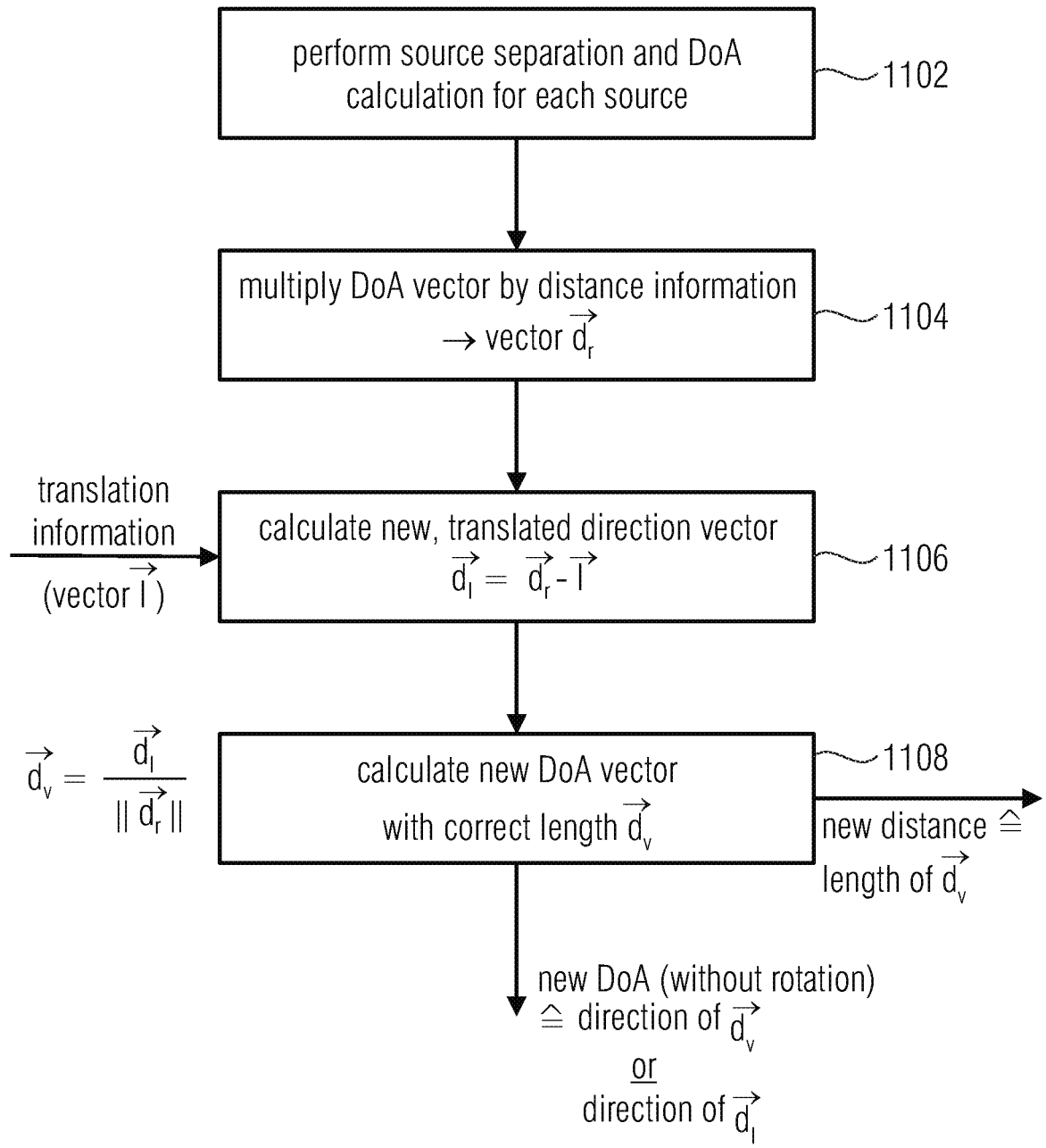
FIG. 6b illustrates an implementation for calculating a new DoA and a new distance of a sound source with respect to a new/different reference location.
Figure 6C:
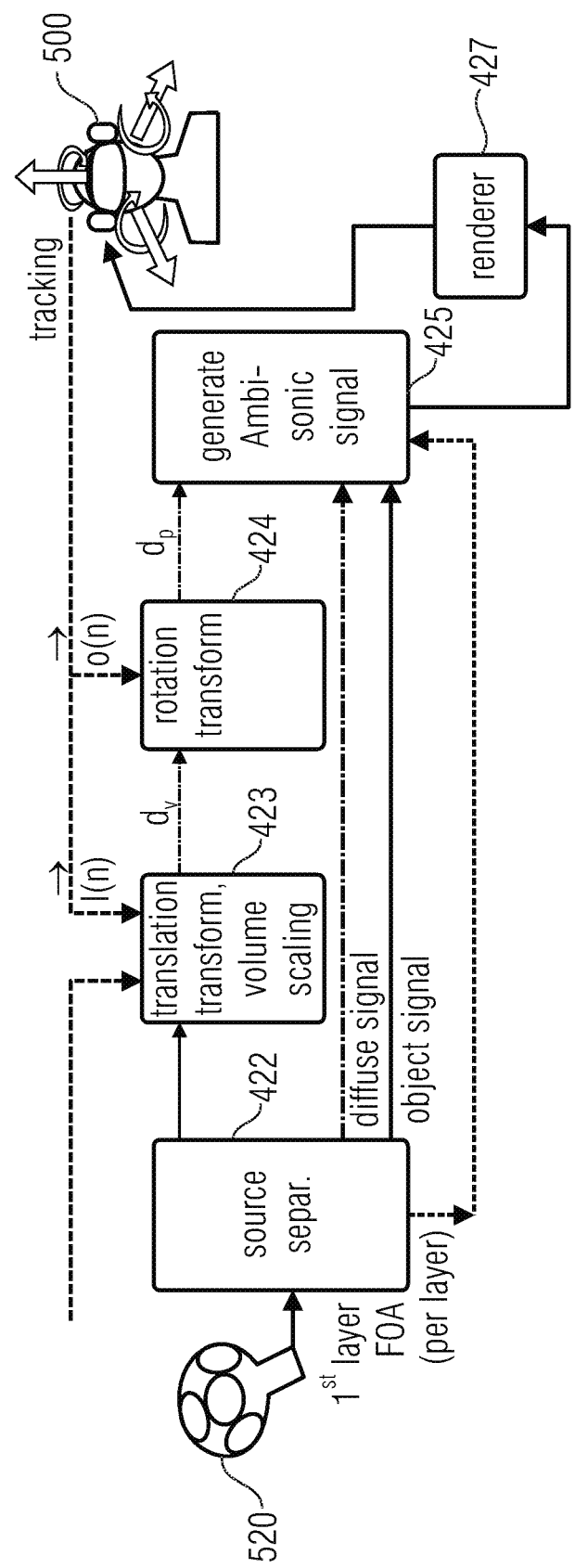
FIG. 6c illustrates an embodiment of a 6DoF reproduction comprising an apparatus for generating an enhanced sound field description, for example, for each individual sound field description and an apparatus for generating a modified sound field description for the matched sources.

The method for transforming an FOA signal according to the listeners perspective in 6DoF can be divided into five steps, cf. FIG. 6c.

FIG. 6c illustrates a method of 6DoF reproduction. The recorded FOA signal in B-Format is processed by a DirAC encoder that computes direction and diffuseness values for each time-frequency bin of the complex spectrum. The direction vector is then transformed by the listener's tracked position and according to the distance information given in a distance map for each source derived by e.g. triangulation calculations. The resulting direction vector is then rotated according to the head rotation. Finally, signals for 8+4 virtual loudspeaker channels are synthesized in the DirAC decoder. These are then binauralized.

In the embodiment, the input signal is analyzed in the DirAC encoder 422, the distance information is added from the distance map m(r) giving a distance for each (matched) source, then the listener's tracked translation and rotation are applied in the novel transforms 423 and 424. The DirAC decoder 425 synthesizes signals for 8+4 virtual loudspeakers, which are in turn binauralized 427 for headphone playback. Note that as the rotation of the sound scene after the translation is an independent operation, it could be alternatively applied in the binaural renderer. The only parameter transformed for 6DoF is the direction vector. By the model definition, the diffuse part is assumed to be isotropic and homogeneous and thus is kept unchanged.

The input to the DirAC encoder is an FOA sound signal in B-format representation. It consists of four channels, i.e., the omnidirectional sound pressure and the three first-order spatial gradients, which under certain assumptions are proportional to the particle velocity. This signal is encoded in a parametric way, cf. [18]. The parameters are derived from the complex sound pressure P (k, n), which is the transformed omnidirectional signal and the complex particle velocity vector U (k, n)=[$U_X$ (k, n), $U_Y$ (k, n), $U_Z$ (k, n)] corresponding to the transformed gradient signals.

The DirAC representation consists of the signal P (k, n), the diffuseness $\psi$ (k, n) and direction r (k, n) of the sound wave at each time-frequency bin. To derive the latter, first, the active sound intensity vector $I_a$ (k, n) is computed as the real part (denoted by Re(·)) of the product of pressure vector with the complex conjugate (denoted by (·)*) of the velocity vector [18]:

$$I_a(k,n) = \tfrac{1}{2} \operatorname{Re}(P(k,n)U^*(k,n)). \tag{1}$$

The diffuseness is estimated from the coefficient of Variation of this vector [18].

$$\psi(k, n) = \sqrt{1 - \frac{\|E\{I_a(k, n)\}\|}{E\{\|I_a(k, n)\|\}}} \tag{2}$$

where E denotes the expectation operator along time frames, implemented as moving average.

Since it is intended to manipulate the sound using a direction-based distance map having a distance for each (matched) source to the reference location, the variance of the direction estimates should be low in an optional embodiment. As the frames are typically short, this is not always the case. Therefore, a moving average is applied to obtain a smoothed direction estimate $\bar{I}_a(k, n)$. The DoA of the direct part of the signal is then, in an embodiment computed as unit length vector in the opposite direction:

$$r_r(k, n) = -\frac{\bar{I}_a(k, n)}{\|\bar{I}_a(k, n)\|} \tag{3}$$

As the direction is encoded as a three-dimensional vector of unit length for each time-frequency bin, it is straightforward to integrate the distance information. The direction vectors are multiplied with their corresponding map entry such that the vector length represents the distance of the corresponding sound source $d_r$(k, n):

$$d_r(k, n) = r_r(k, n) d_r(k, n) \tag{4}$$
$$= r_r(k, n) m(r_r(k, n))$$

where $d_r$ (k, n) is a vector pointing from the recording position of the microphone to the sound source active at time n and frequency bin k.

The listener position is given by the tracking system for the current processing frame as l(n). With the vector representation of source positions, one can subtract the tracking position vector l(n) to yield the new, translated direction vector $d_1$ (k, n) with the length $d_1$ (k, n)=$\|d_1(k, n)\|$, cf. FIG. 6b. The distances from the listener's PoV to the sound sources are derived, and the DoAs are adapted in a single step:

$$d_1(k,n) = d_r(k,n) - l(n) \tag{5}$$

An important aspect of realistic reproduction is the distance attenuation. The attenuation is assumed to be a function of the distance between sound source and listener [19]. The length of the direction vectors is to encode the attenuation or amplification for reproduction. The distance to the recording position is encoded in $d_r$ (k, n) according to the distance map, and the distance to be reproduced encoded in $d_1$ (k, n). If one normalizes the vectors to unit length and then multiply by the ratio of old and new distance, one sees that the useful length is given by dividing $d_1$ (k, n) by the length of the original vector:

$$d_V(k, n) = \frac{d_1(k, n)}{\|d_1(k, n)\|} \frac{\|d_1(k, n)\|}{\|d_r(k, n)\|} = \frac{d_1(k, n)}{\|d_r(k, n)\|} \tag{6}$$

The changes for the listener's orientation are applied in the following step. The orientation given by the tracking can be written as vector composed of the pitch, yaw, and roll o(n)=[$o_X$(n), $o_Z$(n), $o_Y$(n)]$^T$ relative to the recording position as the origin. The source direction is rotated according to the listener orientation, which is implemented using 2D rotation matrices:

$$d_p(k,n) = R_Y(o_Y(n)) R_Z(o_Z(n)) R_X(o_X(n)) d_v(k,n) \tag{7}$$

The resulting DoA for the listener is then given by the vector normalized to unit length:

$$r_p(k, n) = \frac{d_p(k, n)}{\|d_p(k, n)\|} \tag{8}$$

The transformed direction vector, the diffuseness, and the complex spectrum are used to synthesize signals for a uniformly distributed 8+4 virtual loudspeaker setup. Eight virtual speakers are located in 45° azimuth steps on the listener plane (elevation 0°), and four in a 90° cross formation above at 45° elevation. The synthesis is split into a direct and diffuse part for each loudspeaker channel 1≤i≤I, where I=12 is the number of loudspeakers [16]:

$$Y_i(k,n)=Y_{i,S}(k,n)+Y_{i,D}(k,n) \qquad (9)$$

For the direct part, edge fading amplitude panning (EFAP) panning is applied to reproduce the sound from the right direction given the virtual loudspeaker geometry [20]. Given the DoA vector $r_p$ (k, n), this provides a panning gain $G_i(r)$ for each virtual loudspeaker channel i. The distance-dependent gain for each DoA is derived from the resulting length of the direction vector, $d_p$ (k, n). The direct synthesis for channel i becomes:

$$Y_{i,S}(k,n)=\sqrt{1-i(k,n)}P(k,n)G_i(r_p(k,n))(\|d_p(k,n)\|)^{-\gamma} \qquad (10)$$

where the exponent γ is a tuning factor that is typically set to about 1 [19]. Note that with γ=0 the distance-dependent gain is turned off.

The pressure P(k, n) is used to generate I decorrelated signals $\tilde{P}_i$(k, n). These decorrelated signals are added to the individual loudspeaker channels as the diffuse component. This follows the standard method [16]:

$$Y_{i,D}(k, n) = \sqrt{\psi(k, n)}\frac{1}{\sqrt{I}}\tilde{P}_i(k, n) \qquad (11)$$

The diffuse and direct part of each channel are added together, and the signals are transformed back into the time domain by an inverse STFT. These channel time domain signals are convolved with HRTFs for the left and right ear depending on the loudspeaker position to create binauralized signals.

FIG. 6a illustrates a further embodiment for calculating the modified sound field using the spatial information, and the first and the second sound field descriptions and the translation information indicating a translation of a reference location to a different reference location as, for example, discussed with respect to vector I in FIG. 4c or FIG. 5.

FIG. 6a illustrates block 700 indicating an application of a sound separation or, generally, sound analysis procedure to the first sound field description related to reference position A of FIG. 4c and the second sound field description related to reference position B of FIG. 4c.

This procedure will result in a first group of one or more extracted objects and, additionally, in a second group of one or more extracted objects.

These groups are used within block 702 for calculating the direction of arrival information for all separated sources, i.e., for the first group of extracted sources and the second group of one or more extracted sources.

In other embodiments, steps 700 and 702 are implemented within a single procedure providing, on the one hand, the signal for the source and on the other hand the DoA information for the source. This is also true for parametric procedures such as time/frequency-selective procedures as DirAC, where the source signal is the signal of the B-format representation in a time/frequency bin or the pressure signal or omnidirectional signal of the time/frequency bin and the DoA information as the DoA parameter for this specific bin.

Then, in step 704, a source matching is performed between the sources of the first group and the sources of the second group and the result of the source matching are matched sources.

These matched sources are used for computing a sound field for each matched object using the new DoA and the new distance as illustrated in block 710. Furthermore, the directional of arrival information of the matched objects, i.e., two per each object such as a and p of FIG. 4c for source A are used in block 706 in order to calculate the positions of the matched objects or alternatively or additionally, the distances of the matched objects using, for example, triangulation operations.

The result of block 706 is the position of each matched object or alternatively or additionally, the distance of a matched object to one of the first or the second reference location A, B, illustrated, for example in FIG. 4c.

Additionally, it is advantageous to not only use translation information in block 708 but also rotation information for calculating the new direction of arrival information and the new distances for the matched objects.

Although it has been outlined that the positions of the matched objects are input into step 708, it is to be emphasized, that for only calculating the new direction of arrival information for a matched object, the actual position of the matched object or, in other words, the distance of the matched object is not necessary for calculating the new direction of arrival with respect to a new (different) reference location, to which a listener has moved to, for example, the distance is not necessary.

However, the distance may then be used in order to adapt the source signal to the new situation. Thus, when the distance of the source or sound object to the new reference position has become shorter, then a scaling factor will be calculated that is lower than one.

When, however, the distance becomes higher, then a scaling factor is calculated to be higher than one as, for example, discussed with respect to FIG. 6b. Hence, although illustrated in FIG. 6a for an embodiment, it is not necessarily the case that explicit positions of the matched objects and, then, the distances of the matched objects are calculated and, then, the sound field is calculated for each matched object using the new direction of arrival and the new distance. Instead, only the distance of a matched object to one reference location of the two reference locations is generally sufficient and, then, a sound field for each matched object is calculated using the new DoA and the new distance.

Additionally, block 714 illustrates the calculation of sound fields for the non-matched objects using the old DoA information obtained by block 702. Furthermore, the sound fields for the matched objects obtained in blocks 710 and the non-matched objects obtained by block 714 are combined in block 712 in order to obtain the modified sound field description that can, for example, be an Ambisonics description such as a first-order Ambisonics description, a higher-order Ambisonics description or, alternatively, a loudspeaker channel description related to certain loudspeaker setup that, of course, is the same for block 710 and block 714 so that a simple channel-by-channel addition can be performed in block 712.

FIG. 6b illustrates an implementation of the sound field calculator 420. In block 1102, a source separation and a direction of arrival or generally direction information calculation for each source is performed. Then, in block 1104, the direction of arrival vector is multiplied by the distance information vector, i.e., the vector from the original reference location to the sound source, i.e., the vector from item 520 to item 510 of FIG. 5, for example. Then, in block 1106, the translation information, i.e., the vector from item 520 to item 500 of FIG. 5 is taken into account in order to calculate the new translated direction vector that is the vector from the listener position 500 to the sound source position 510. Then, the new direction of arrival vector with the correct length indicated by $d_v$ is calculated in block 1108. This vector is directed in the same direction as $d_r$, but has a different length, since the length of this vector reflects the fact that the sound source 510 is recorded in the original sound field with a certain volume and, therefore, the length of $d_v$ more or less indicates the loudness change. This is obtained by dividing vector $d_l$ by the recording distance $d_r$, i.e., the length of vector $d_r$ from the microphone 520 to the sound source 510. As stated, the length of the vector $d_r$ from the microphone 520 to the sound source 510 can be derived by triangulation calculation. When the microphone is in the reference location of the first sound field description, then the distance from the reference location of the first sound field description to the sound source is used. When, however, the microphone is in the further reference location of the second sound field description, then the distance from the further reference location of the second sound field description to the sound source is used.

When, as in FIG. 5, the reproduced distance is greater than the recorded distance, then the length of $d_v$ will be lower than unity. This will result an attenuation of the sound source 510 for the reproduction at the new listener position. When, however, the reproduced distance $d_l$ is smaller than the recorded distance, then the length of $d_v$ as calculated by block 1108 will be greater than 1 and a corresponding scaling factor will result in an amplification of the sound source.

Figure 7:
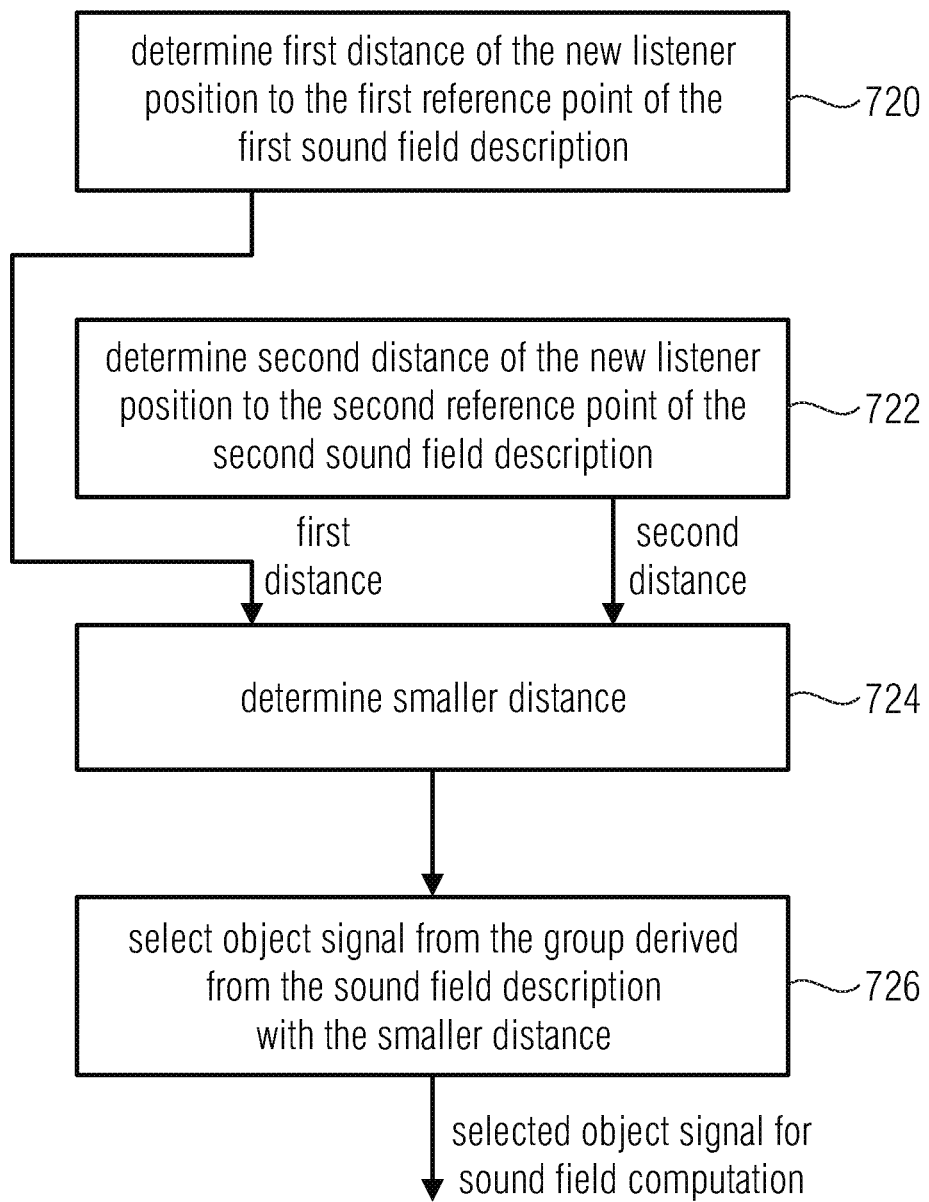
FIG. 7 illustrates an embodiment for selecting the one of the first and the second sound field descriptions for the calculation of a modified sound field for a broadband or narrow band object.

In FIG. 6a, item 710 indicates that the sound field for each matched object is calculated using the new direction of arrival information and the new distance. However, basically, for computing the sound field for each matched object, the object signals obtained from either the first group of one or more extracted sources or the second group of one or more extracted sources can be used in general. In an embodiment, however, a specific selection illustrated in FIG. 7 is performed in order to determine which sound field description is used for performing the sound field computation in block 710. In block 720, the first distance of the new listener position to the first reference location of the first sound field description is determined. With respect to FIG. 4c, this is the distance between the difference reference location and reference position A.

Furthermore, in step 722, the second distance of the new listener position to the second reference location of the second sound field description is determined. In this embodiment of FIG. 4c, this would be the distance between the different reference location (due to translation) and reference position B.

It appears that the distance from the different reference location to reference position B is lower than the difference from the different reference location to the reference position A.

Thus, this would be determined in step 724. And, in step 726, the object signal is selected from the group derived from the sound field description with the smaller distance. Thus, in order to render sources A and B which correspond to matched sources in FIG. 4c illustration, the sound source signals derived from the second sound field description related to the further reference position B would be used.

In other embodiments, however, where the translation points from the origin to a different reference location, for example, to the left in the FIG. 4c illustration, the smaller distance would be from this other reference location to the reference position A and, then, the first sound field description would be used for finally computing the sound field for each matched object in block 710 of FIG. 6b. Again, the selection would be performed by the procedure illustrated in FIG. 7.

Figure 9:
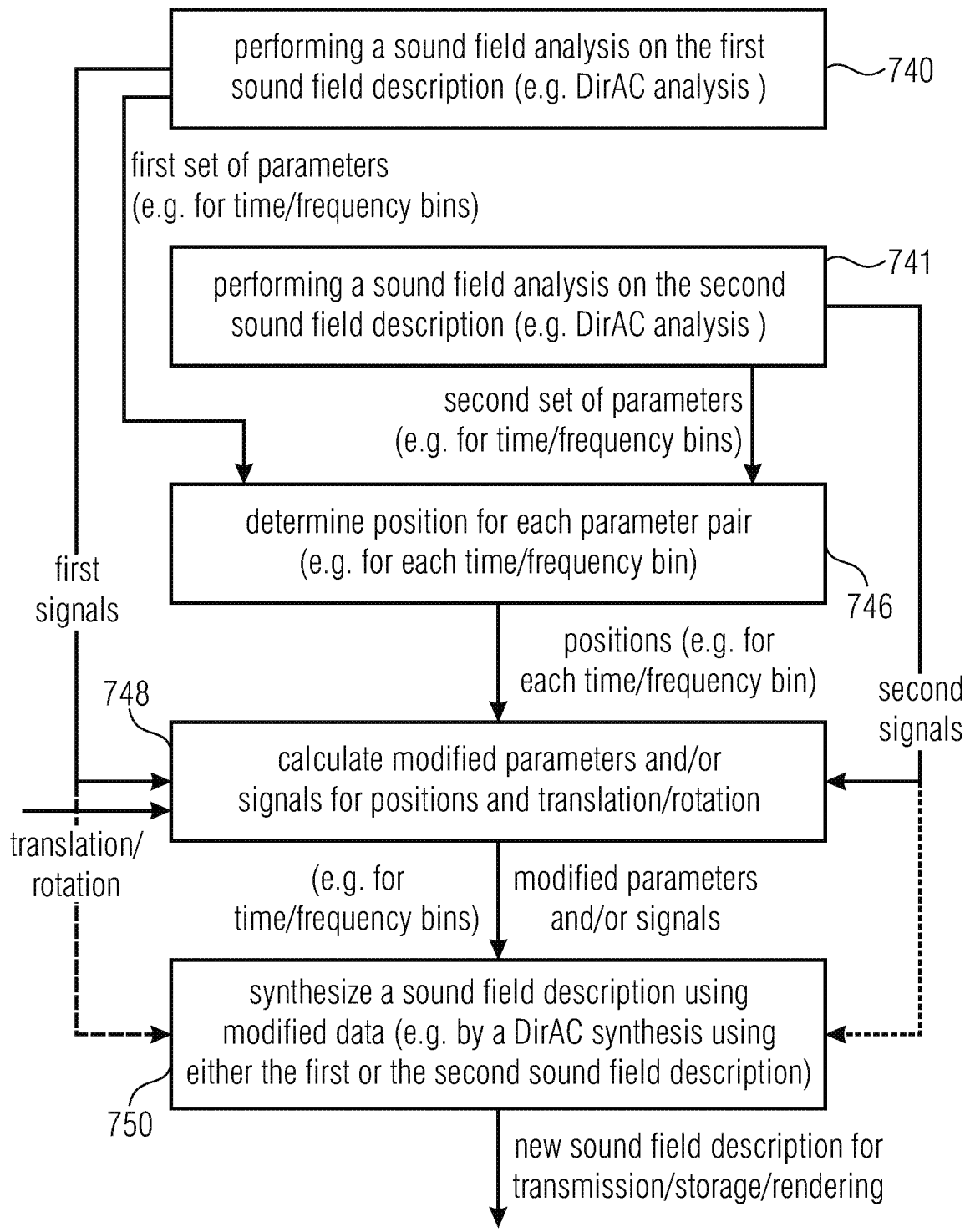
FIG. 9 illustrates a further embodiment for the sound field calculator.

FIG. 9 illustrates a further embodiment. In step 740, a sound field analysis on the first sound field description is performed, for example, a parametric sound field analysis in the form of a DirAC analysis illustrated in block 422 of FIG. 6c.

This results in a first set of parameters, for example, for each time/frequency bin, where each set of parameters comprises a DoA parameter and, optionally, a diffuseness parameter.

In step 741, a sound field analysis is performed on the second sound field description and, again, a DirAC analysis is performed as in block 740 and as, for example, discussed with respect to block 422 of FIG. 6c.

This results in a second set of parameters, for example, for time/frequency bins.

Then, in block 746, a position for each parameter pair can be determined using the corresponding DoA parameter from the first time/frequency bin and the DoA parameter from the same time/frequency bin from the second set of parameters. This will result in a position for each parameter pair. However, the position will be more useful the lower the diffuseness for the corresponding time/frequency bin is in the first set of parameters and/or the second set of parameters.

Thus, it is advantageous to only further use the positions from the time/frequency bins that have resulted in a quite low diffuseness in both the first and the second set of parameters.

Additionally, it is advantageous to also perform a correlation for the corresponding signals in the time/frequency bin as also output by block 740 and block 741.

Thus, the "source matching" of step 704 in FIG. 6a can, for example, be fully avoided and be replaced by a determination of matched sources/matched time/frequency bins based on the diffuseness parameters or the matching can be performed additionally using the corresponding signal in the time/frequency bin from the B-format components for example, or from the pressure signal or object signal output by block 422 of FIG. 6c.

In any case, block 46 will result in certain positions for certain (selected) time/frequency bins that correspond to the "matched objects" found in block 704 of FIG. 6a.

Then, in block 748, modified parameters and/or signals for the positions obtained by block 746 and/or the corresponding translation/rotation as obtained, for example, by a hat tracker are calculated and the output of block 748 represents modified parameters and/or modified signals for different time/frequency bins.

Thus, block 748 may correspond to the translation transform 423 and rotation transform of block 424 for the purpose of calculating modified parameters and the calculation of modified signals would, for example, be performed by block 425 of FIG. 6c also under the consideration of a certain scaling factor derived from the positions for the corresponding time/frequency bins.

Finally, a synthesis of the sound field description is performed in block 750 using the modified data. This can, for example, be done by a DirAC synthesis using either the first or the second sound field description or can be performed by Ambisonics signal generator as illustrated in block 425 and the result will be the new sound field description for transmission/storage/rendering.

Figure 10:
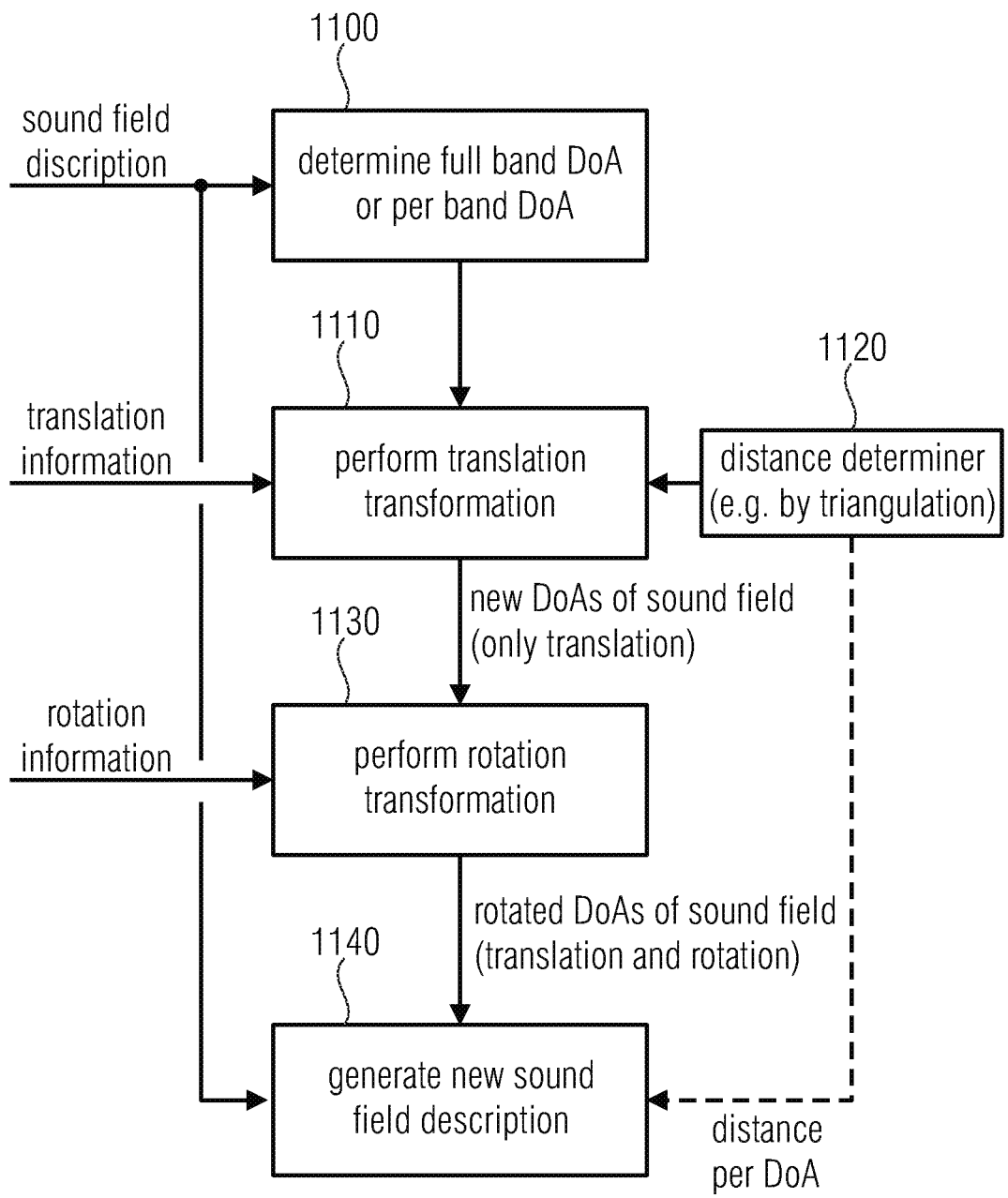
FIG. 10 illustrates an implementation of the apparatus for generating a modified sound field description.

FIG. 10 illustrates a further implementation of the sound field calculator 420. At least parts of the procedure illustrated in FIG. 10 are performed for each matched source separately.

The block 1120 determines the distance for a matched source e.g. by triangulation calculation.

Based on the sound field description, a full band direction of arrival or a per band direction of arrival is determined in 1100. These direction of arrival information represent the direction of arrival data of the sound field. Based on this direction of arrival data, a translation transformation is performed in block 1110. To this end, block 1120 calculates the distance for each matched source. Based on the data, block 1110 generates the new direction of arrival data for the sound field that, in this implementation, only depends on the translation from the reference location to the different reference location. To this end, block 1110 receives the translation information generated, for example, by a tracking in the context of a virtual reality implementation.

Advantageously or alternatively, a rotation data is used as well. To this end, block 1130 performs a rotation transformation using the rotation information. When both the translation and the rotation is performed, then it is advantageous to perform the rotation transformation subsequent to the calculation of the new DoAs of the sound field that already include the information from the translation and the source distance from block 1120.

Then, in block 1140, the new sound field description is generated. To this end, the original sound field description can be used or, alternatively, source signals that have been separated from the sound field description by a source separation algorithm can be used or any other applications can be used. Basically, the new sound field description can be, for example, a directional sound field description as obtained by the Ambisonics generator 430 or as generated by a DirAC synthesizer 425 or can be a binaural representation generated from a virtual speaker representation in the subsequent binaural rendering.

Advantageously, as illustrated in FIG. 10, the distance per direction of arrival is also used in generating the new sound field description in order to adapt the volume or loudness of a certain sound source to the new location, i.e., the new or different reference location.

Although FIG. 10 illustrates a situation, where the rotation transformation is performed subsequent to the translation transformation, it is to be noted that the order can be different.

Particularly, the rotation transformation can be applied to the DoAs of the sound field as generated by block 1100 and, then, the additional translation transformation is applied that is due to the translation of a subject from the reference location to the different reference location.

As soon as the DoAs of the sound field have been determined by block 1100, the distance information is acquired from the meta data using block 1120 and this distance information is then used by generating the new sound field description in block 1140 for accounting for a changed distance and, therefore, a changed loudness of the certain source with respect to a certain reference location. Basically, it can be said that in case the distance becomes larger, then the specific sound source signal is attenuated while, when the distance becomes shorter, then the sound source signal is amplified. Naturally, the attenuation or amplification of the certain sound source depending on the distance is made in proportion to the distance change, but, in other embodiments, less complex operations can be applied to this amplification or attenuation of sound source signals in quite coarse increments. Even such a less complex implementation provides superior results compared to a situation where any distance change is fully neglected.

Figure 11:
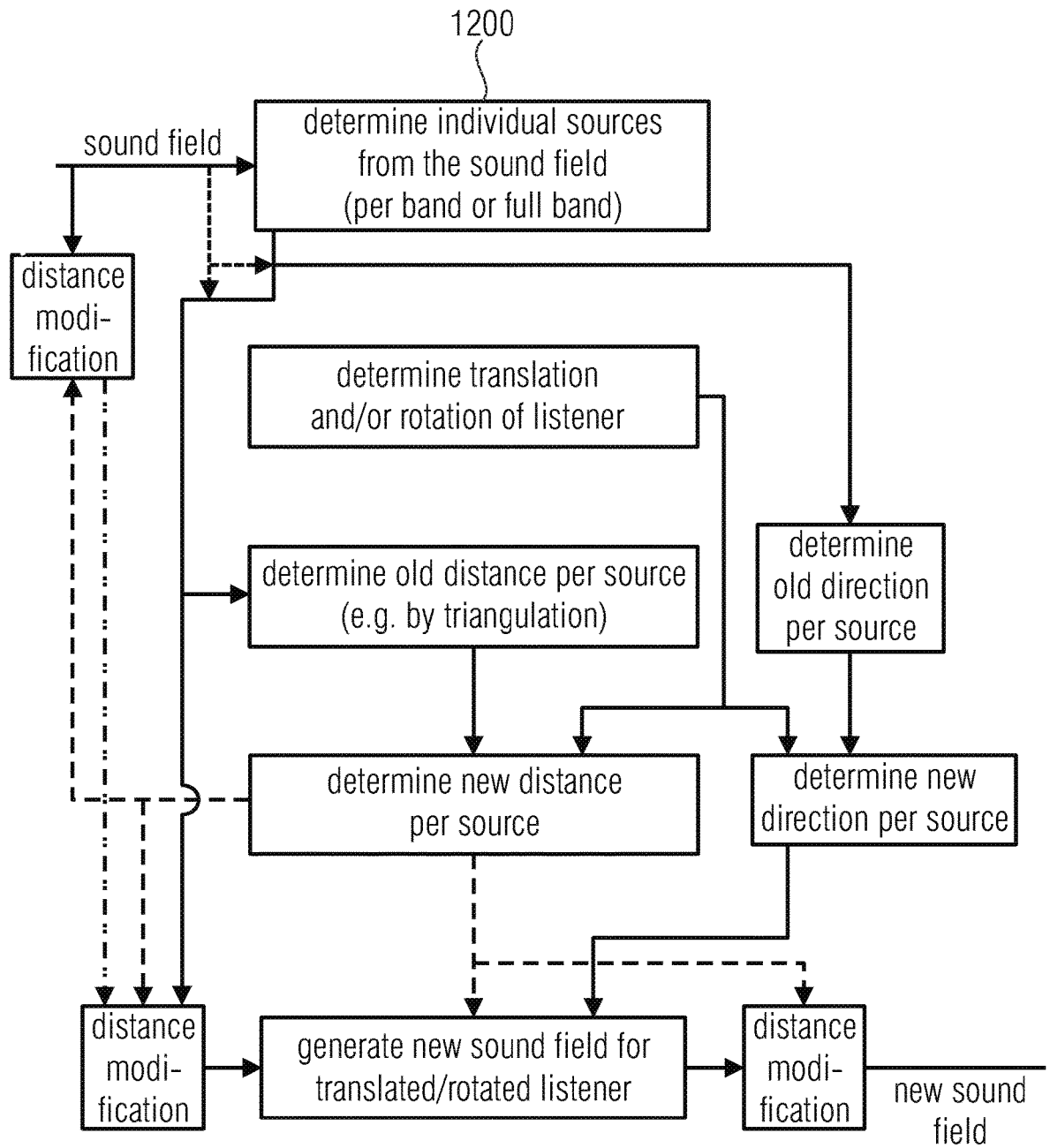
FIG. 11 illustrates a further implementation of an apparatus for generating a modified sound field description.

FIG. 11 illustrates a further implementation of the sound field calculator. In block 1200, the individual sources from the sound field are determined, for example, per band or full band like. When a determination per frame and band is performed, then this can be done by a DirAC analysis. If a full band or subband determination is performed, then this can be done by any kind of a full band or subband source separation algorithm.

In block 1210, a translation and/or a rotation of a listener is determined, for example, by head tracking.

In block 1220, an old distance for each source is determined by using the meta data and, for example, by using the meta data for the triangulation calculation Thus, each band is considered to be a certain source (provided that the diffuseness is lower than a certain threshold), and then, a certain distance for each time/frequency bin having a low diffuseness value is determined.

Then, in block 1230, a new distance per source is obtained, for example, by a vector calculation per band that is, for example, discussed in the context of FIG. 6b.

Furthermore, as illustrated in block 1240, an old direction per source is determined, for example, by a DoA calculation obtained in a DirAC analysis or by a direction of arrival or direction information analysis in a source separation algorithm, for example.

Then, in block 1250, a new direction per source is determined, for example by performing a vector calculation per band or full band.

Then, in block 1260, a new sound field is generated for the translated and rotated listener.

This can be done, for example, by scaling the direct portion per channel in the DirAC synthesis. Depending on the specific implementation, the distance modification can be done in blocks 1270a, 1270b or 1270c in addition or alternatively to performing the distance modification in block 1260.

When, for example, it is determined that the sound field only has a single source, then the distance modification can already be performed in block 1270a.

Alternatively, when individual source signals are calculated by block 1200, then the distance modification can be performed for the individual sources in block 1270b, before the actual new sound field is generated in block 1260.

Additionally, when the sound field generation in block 1260, for example, does not render a loudspeaker setup signal or a binaural signal, but another sound field description, for example, using a Ambisonics encoder or calculator 430, then the distance modification can also be performed subsequent to the generation in block 1260, which means in block 1270c.

Depending on the implementation, a distance modification can also be distributed to several modifiers so that, in the end, a certain sound source is in a certain loudness that is directed by the difference between the original distance between the sound source and the reference location and the new distance between the sound source and the different reference location.

Figure 12A:
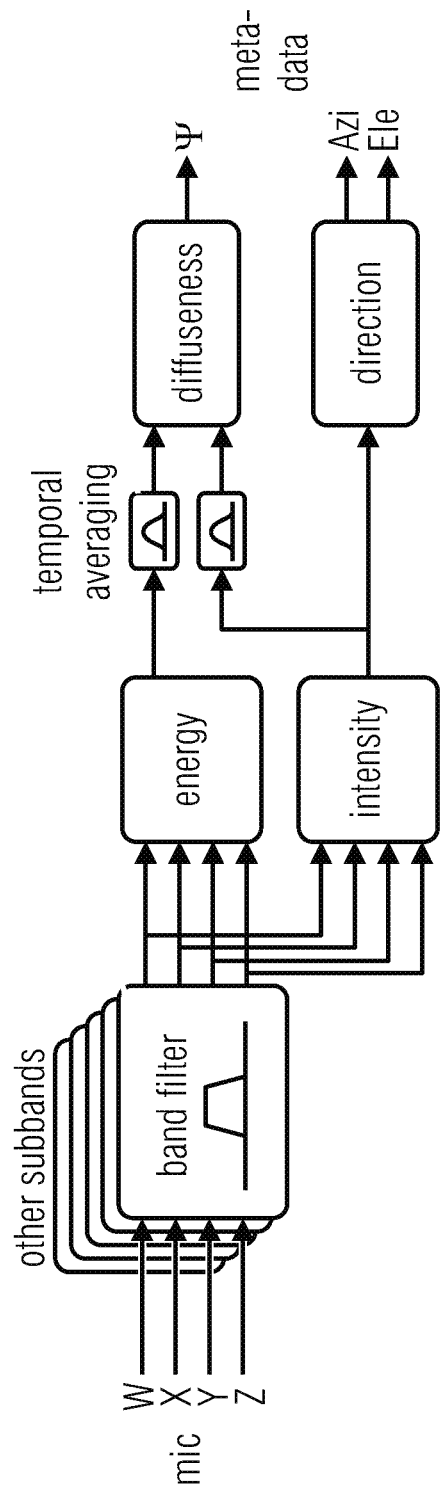
FIG. 12a illustrates a known DirAC analysis implementation.

FIG. 12a illustrates a DirAC analyzer as originally disclosed, for example, in the earlier cited reference "Directional Audio Coding" from IWPASH of 2009.

The DirAC analyzer comprises a bank of band filters 1310, an energy analyzer 1320, an intensity analyzer 1330, a temporal averaging block 1340 and a diffuseness calculator 1350 and the direction calculator 1360.

In DirAC, both analysis and synthesis are performed in the frequency domain. There are several methods for dividing the sound into frequency bands, within distinct properties each.

The most commonly used frequency transforms include short time Fourier transform (STFT), and Quadrature mirror filter bank (QMF). In addition to these, there is a full liberty to design a filter bank with arbitrary filters that are optimized to any specific purposes. The target of directional analysis is to estimate at each frequency band the direction of arrival of sound, together with an estimate if the sound is arriving from one or multiple directions at the same time. In principle, this can be performed with a number of techniques, however, the energetic analysis of sound field has been found to be suitable, which is illustrated in FIG. 12a. The energetic analysis can be performed, when the pressure signal and velocity signals in one, two or three dimensions are captured from a single position. In first-order B-format signals, the omnidirectional signal is called W-signal, which has been scaled down by the square root of two. The sound pressure can be estimated as P=√2*W, expressed in the STFT domain.

The X-, Y- and Z channels have the directional pattern of a dipole directed along the Cartesian axis, which form together a vector U=[X, Y, Z]. The vector estimates the sound field velocity vector, and is also expressed in STFT domain. The energy E of the sound field is computed. The capturing of B-format signals can be obtained with either coincident positioning of directional microphones, or with a closely-spaced set of omnidirectional microphones. In some applications, the microphone signals may be formed in a computational domain, i.e., simulated.

The direction of sound is defined to be the opposite direction of the intensity vector I. The direction is denoted as corresponding angular azimuth and elevation values in the transmitted meta data. The diffuseness of sound field is also computed using an expectation operator of the intensity vector and the energy. The outcome of this equation is a real-valued number between zero and one, characterizing if the sound energy is arriving from a single direction (diffuseness is zero), or from all directions (diffuseness is one). This procedure is appropriate in the case when the full 3D or less dimensional velocity information is available.

Figure 12B:
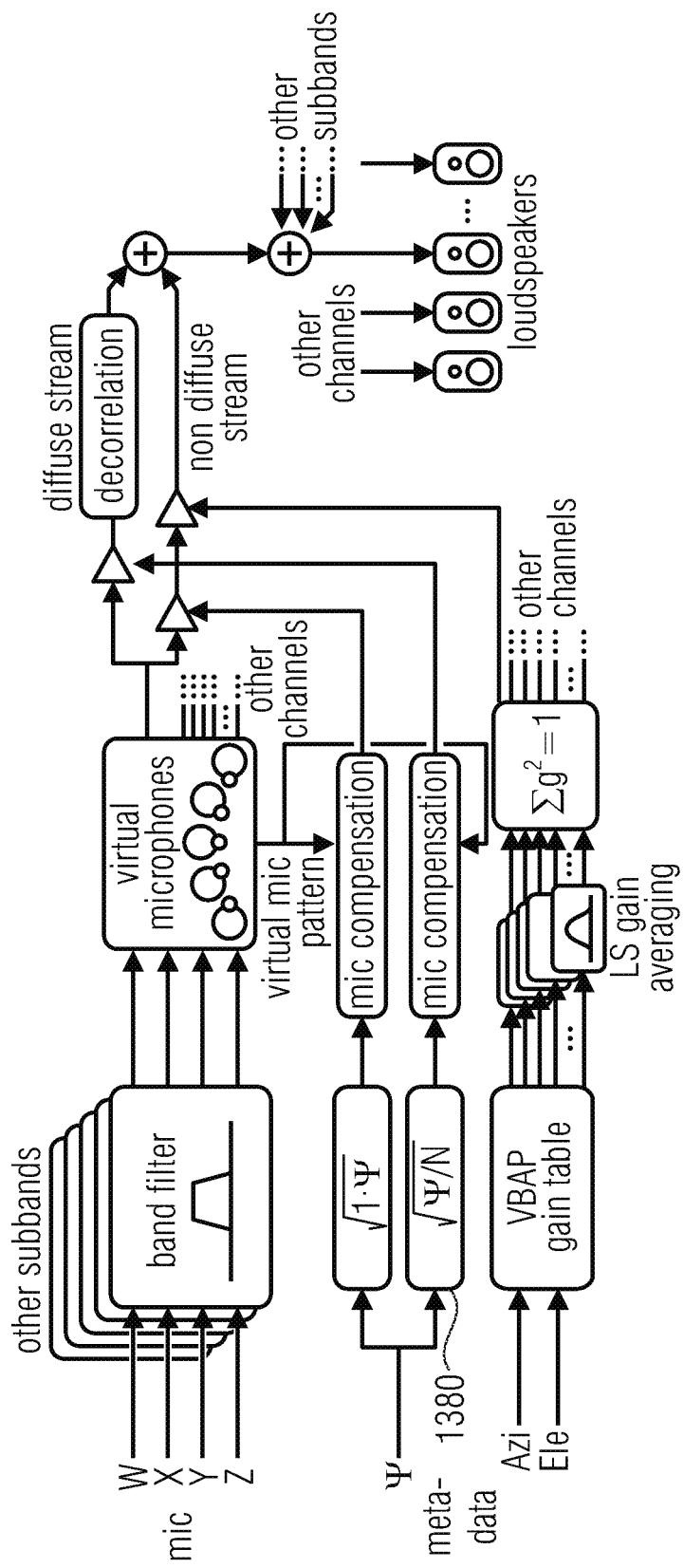
FIG. 12b illustrates a known DirAC synthesis implementation.

FIG. 12b illustrates a DirAC synthesis, once again having a bank of band filters 1370, a virtual microphone block 1400, a direct/diffuse synthesizer block 1450, and a certain loudspeaker setup or a virtual intended loudspeaker setup 1460. Additionally, a diffuseness-gain transformer 1380, a vector based amplitude panning (VBAP) gain table block 1390, a microphone compensation block 1420, a loudspeaker gain averaging block 1430 and a distributer 1440 for other channels is used.

In this DirAC synthesis with loudspeakers, the high quality version of DirAC synthesis shown in FIG. 12b receives all B-format signals, for which a virtual microphone signal is computed for each loudspeaker direction of the loudspeaker setup 1460. The utilized directional pattern is typically a dipole. The virtual microphone signals are then modified in non-linear fashion, depending on the meta data. The low bitrate version of DirAC is not shown in FIG. 12b, however, in this situation, only one channel of audio is transmitted as illustrated in FIG. 6. The difference in processing is that all virtual microphone signals would be replaced by the single channel of audio received. The virtual microphone signals are divided into two streams: the diffuse and the non-diffuse streams, which are processed separately.

The non-diffuse sound is reproduced as point sources by using vector base amplitude panning (VBAP). In panning, a monophonic sound signal is applied to a subset of loudspeakers after multiplication with loudspeaker-specific gain factors. The gain factors are computed using the information of a loudspeaker setup, and specified panning direction.

In the low-bit-rate version, the input signal is simply panned to the directions implied by the meta data. In the high-quality version, each virtual microphone signal is multiplied with the corresponding gain factor, which produces the same effect with panning, however it is less prone to any non-linear artifacts.

In many cases, the directional meta data is subject to abrupt temporal changes. To avoid artifacts, the gain factors for loudspeakers computed with VBAP are smoothed by temporal integration with frequency-dependent time constants equaling to about 50 cycle periods at each band. This effectively removes the artifacts, however, the changes in direction are not perceived to be slower than without averaging in most of the cases.

The aim of the synthesis of the diffuse sound is to create perception of sound that surrounds the listener. In the low-bit-rate version, the diffuse stream is reproduced by decorrelating the input signal and reproducing it from every loudspeaker. In the high-quality version, the virtual microphone signals of diffuse stream are already incoherent in some degree, and they need to be decorrelated only mildly. This approach provides better spatial quality for surround reverberation and ambient sound than the low bit-rate version.

For the DirAC synthesis with headphones, DirAC is formulated with a certain amount of virtual loudspeakers around the listener for the non-diffuse stream and a certain number of loudspeakers for the diffuse steam. The virtual loudspeakers are implemented as convolution of input signals with a measured head-related transfer functions (HRTFs).

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive enhanced sound field description can be stored on a digital storage medium or a non-transitory storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Liitola, T., *Headphone sound externalization*, Ph.D. thesis, Helsinki University of Technology. Department of Electrical and Communications Engineering Laboratory of Acoustics and Audio Signal Processing., 2006.
[2] Blauert, J., *Spatial Hearing—Revised Edition: The Psychophysics of Human Sound Localization*, The MIT Press, 1996, ISBN 0262024136.
[3] Zhang, W., Samarasinghe, P. N., Chen, H., and Abhayapala, T. D., "Surround by Sound: A Re-view of Spatial Audio Recording and Reproduction," *Applied Sciences*, 7(5), p. 532, 2017.
[4] Bates, E. and Boland, F., "Spatial Music, Virtual Reality, and 360 Media," in *Audio Eng. Soc. Int. Conf. on Audio for Virtual and Augmented Reality*, Los Angeles, CA, U.S.A., 2016.
[5] Anderson, R., Gallup, D., Barron, J. T., Kontkanen, J., Snavely, N., Esteban, C. H., Agarwal, S., and Seitz, S. M., "Jump: Virtual Reality Video," *ACM Transactions on Graphics*, 35(6), p. 198, 2016.
[6] Merimaa, J., *Analysis, Synthesis, and Perception of Spatial Sound: Binaural Localization Modeling and Multichannel Loudspeaker Reproduction*, Ph.D. thesis, Helsinki University of Technology, 2006.
[7] Kronlachner, M. and Zotter, F., "Spatial Transformations for the Enhancement of Ambisonics Recordings," in *2nd International Conference on Spatial Audio*, Erlangen, Germany, 2014.
[8] Tsingos, N., Gallo, E., and Drettakis, G., "Perceptual Audio Rendering of Complex Virtual Environments," *ACM Transactions on Graphics*, 23(3), pp. 249-258, 2004.
[9] Taylor, M., Chandak, A., Mo, Q., Lauterbach, C., Schissler, C., and Manocha, D., "Guided multi-view ray tracing for fast auralization," *IEEE Trans. Visualization & Comp. Graphics*, 18, pp. 1797-1810, 2012.
[10] Rungta, A., Schissler, C., Rewkowski, N., Mehra, R., and Manocha, D., "Diffraction Kernels for Interactive Sound Propagation in Dynamic Environments," *IEEE Trans. Visualization & Comp. Graphics*, 24(4), pp. 1613-1622, 2018.
[11] Thiergart, O., Kowalczyk, K., and Habets, E. A. P., "An Acoustical Zoom based on Informed Spatial Filtering," in *Int. Workshop on Acoustic Signal Enhancement*, pp. 109-113, 2014.
[12] Khaddour, H., Schimmel, J., and Rund, F., "A Novel Combined System of Direction Estimation and Sound Zooming of Multiple Speakers," *Radioengineering*, 24(2), 2015.
[13] Ziegler, M., Keinert, J., Holzer, N., Wolf, T., Jaschke, T., op het Veld, R., Zakeri, F. S., and Foessel, S., "Immersive Virtual Reality for Live-Action Video using Camera Arrays," in *IBC*, Amsterdam, Netherlands, 2017.
[14] Thiergart, O., Galdo, G. D., Taseska, M., and Habets, E. A. P., "Geometry-Based Spatial Sound Acquisition using Distributed Microphone Arrays," *IEEE Trans. Audio, Speech, Language Process.*, 21(12), pp. 2583-2594, 2013.
[15] Kowalczyk, K., Thiergart, O., Taseska, M., Del Galdo, G., Pulkki, V., and Habets, E. A. P., "Parametric Spatial Sound Processing: A Flexible and Efficient Solution to Sound Scene Acquisition, Modification, and Reproduction," *IEEE Signal Process. Mag.*, 32(2), pp. 31-42, 2015.
[16] Pulkki, V., "Spatial Sound Reproduction with Directional Audio Coding," *J. Audio Eng. Soc.*, 55(6), pp. 503-516, 2007.
[17] International Telecommunication Union, "ITU-R BS.1534-3, Method for the subjective assessment of intermediate quality level of audio systems," 2015.
[18] Thiergart, O., Del Galdo, G., Kuech, F., and Prus, M., "Three-Dimensional Sound Field Analysis with Directional Audio Coding Based on Signal Adaptive Parameter Estimators," in *Audio Eng. Soc. Conv. Spatial Audio: Sense the Sound of Space*, 2010.
[19] Kuttruff, H., *Room Acoustics*, Taylor & Francis, 4 edition, 2000.
[20] Borß, C., "A polygon-based panning method for 3D loudspeaker setups," in *Audio Eng. Soc. Conv.*, pp. 343-352, Los Angeles, CA, USA, 2014.
[21] Rummukainen, O., Schlecht, S., Plinge, A., and Habets, E. A. P., "Evaluating Binaural Reproduction Systems from Behavioral Patterns in a Virtual Reality—A Case Study with Impaired Binaural Cues and Tracking Latency," in *Audio Eng. Soc. Conv.* 143, New York, NY, USA, 2017.
[22] Engelke, U., Darcy, D. P., Mulliken, G. H., Bosse, S., Martini, M. G., Arndt, S., Antons, J.-N., Chan, K. Y., Ramzan, N., and Brunnström, K., "Psychophysiology- Based QoE Assessment: A Survey," *IEEE Selected Topics in Signal Processing,* 11(1), pp. 6-21, 2017.
[23] Schlecht, S. J. and Habets, E. A. P., "Sign-Agnostic Matrix Design for Spatial Artificial Reverberation with Feedback Delay Networks," in *Proc. Audio Eng. Soc. Conf.,* pp. 1-10-accepted, Tokyo, Japan, 2018
[31] M. A. Gerzon, "Periphony: With-height sound reproduction," *J. Acoust. Soc. Am.,* vol. 21, 110. 1, pp. 2-10, 1973.
[32] V. Pulkki, "Directional audio coding in spatial sound reproduction and stereo upmixing," in *Proc. of the 28th AES International Conference,* 2006.
[33] --, "Spatial sound reproduction with directional audio coding," *Journal Audio Eng. Soc.,* vol. 55, no. 6, pp. 503-516, June 2007.
[34] C. G. and G. M., "Coincident microphone simulation covering three dimensional space and yielding various directional outputs," U.S. Pat. No. 4,042,779, 1977.
[35] C. Faller and F. Baumgarte, "Binaural cue coding—part ii: Schemes and applications," *IEEE Trans. Speech Audio Process.,* vol. 11, no. 6, November 2003.
[36] C. Faller, "Parametric multichannel audio coding: Synthesis of coherence cues," *IEEE Trans. Speech Audio Process.,* vol. 14, no. 1, January 2006.
[37] H. P. J. E. E. Schuijers, J. Breebaart, "Low complexity parametric stereo coding," in *Proc. of the 116th A ES Convention,* Berlin, Germany, 2004.
[38] V. Pulkki, "Virtual sound source positioning using vector base amplitude panning," *J. Acoust. Soc. Am.,* vol. 45, no. 6, pp. 456-466, June 1997.
[39] J. G. Tylka and E. Y. Choueiri, "Comparison of techniques for binaural navigation of higher-order ambisonics sound fields," in *Proc. of the AES International Conference on Audio for Virtual and Augmented Reality,* New York, September 2016.

The invention claimed is:

1. An apparatus for generating a modified sound field description, comprising:
   an interface configured for receiving a sound field description and meta data relating to spatial information of the sound field description, wherein the sound field description comprises a plurality of sound field components, the plurality of sound field components comprising an omnidirectional component and at least one directional component; and
   a sound field calculator configured for calculating the modified sound field description using the spatial information, the sound field description and a translation information indicating a translation of a reference location to a different reference location, wherein the sound field calculator comprises:
      a sound field analyzer for analyzing the sound field components to derive, for different frequency bins, a direction of arrival information;
      a translation transformer for calculating a modified direction of arrival information per frequency bin using the direction of arrival information and the meta data, the meta data comprising a depth map associating a distance information to a source represented by the frequency bin; and
      a distance compensator for calculating the modified sound field description using a distance compensation information depending on the distance information provided by the depth map for the source represented by the frequency bin, and a new distance associated with the frequency bin being related to the modified direction of arrival information.

2. The apparatus of claim 1, wherein the sound field calculator is configured to apply a rotation of the modified sound field description.

3. The apparatus of claim 1, wherein the modified sound field description is an Ambisonics sound field description.

4. The apparatus of claim 1, further comprising:
   a translation interface for providing the translation information or a rotation information indicating a rotation of an intended listener for the modified sound field description;
   a meta data supplier for supplying the meta data to the sound field calculator;
   a sound field supplier for supplying the sound field description to the sound field calculator; and
   an output interface for outputting a modified sound field comprising the modified sound field description and modified meta data, the modified meta data being derived from the meta data using the translation information, or for outputting a plurality of loudspeaker channels, each loudspeaker channel being related to a predefined loudspeaker position, or for outputting a binaural representation of the modified sound field.

5. An apparatus for generating a modified sound field description, comprising:
   an interface configured for receiving a sound field description and meta data relating to spatial information of the sound field description; and
   a sound field calculator configured for calculating the modified sound field description using the spatial information, the sound field description, and a translation information indicating a translation of a reference location to a different reference location, wherein the sound field calculator is configured, for one or more sound sources,
      for calculating a first vector pointing from the reference location to a sound source of the one or more sound sources obtained by an analysis of a sound field described by the sound field description;
      for calculating a second vector pointing from the different reference location to the sound source of the one or more sound sources using the first vector and the translation information, the translation information defining a translation vector from the reference location to the different reference location; and
      for calculating a distance modification value using the different reference location, a location of the sound source of the one or more sound sources, and the second vector, or using a distance from the different reference location to the location of the sound source of the one or more sound sources and the second vector.

6. The apparatus of claim 5, wherein the first vector is calculated by multiplying a direction of arrival unit vector by a distance included in the meta data, or
   wherein the second vector is calculated by subtracting a translation vector from the first vector, the translation information defining the translation vector from the reference location to the different reference location, or
   wherein the distance modification value is calculated by dividing the second vector by a norm of the first vector.

7. The apparatus of claim 5, wherein the sound field calculator is configured to receive, in addition to the translation information, a rotation information, and
   wherein the sound field calculator is configured to perform a rotation transformation to rotate a direction of arrival data for a sound field described by the sound field description using the rotation information, wherein the direction of arrival data is derived from a direction of arrival data obtained by the analysis of the sound field described by the sound field description and using the translation information.

8. The apparatus of claim 5, wherein the sound field calculator is configured:
to determine a plurality of sound sources comprising the sound source from the sound field description and directions for the sound sources of the plurality of sound sources by the analysis of the sound field described by the sound field description; and
wherein the sound field calculator is configured, when calculating the distance modification information,
to determine, for the sound source of the plurality of sound sources, a distance of the sound source to the reference location using the meta data;
to determine a new direction of the sound source of the plurality of sound sources related to the different reference location using the direction for the sound source and the translation information; and
to determine a new distance information for the sound source of the plurality of sound sources related to the different reference location; and
wherein the sound field calculator is configured to generate the modified sound field description using the distance modification value, and the sound field description or source signals corresponding to the plurality of sound sources derived from the sound field description by the analysis of the sound field described by the sound field description.

9. An apparatus for generating a modified sound field description, comprising:
an interface configured for receiving a sound field description and meta data relating to spatial information of the sound field description; and
a sound field calculator configured for calculating the modified sound field description using the spatial information, the sound field description and a translation information indicating a translation of a reference location to a different reference location, wherein the sound field calculator is configured:
to determine source signals from the sound field description and directions of the source signals related to the reference location by a sound analysis;
to calculate new directions of the source signals related to the different reference location using the translation information;
to calculate distance information for the source signals related to the different reference location; and
to synthesize the modified sound field description using the distance information, the source signals and the new directions,
wherein the sound field calculator is configured: to synthesize the modified sound field description by panning a source signal of the source signals to a direction given by the new direction in relation to a replay setup, and by scaling the source signal using the distance information before performing the panning or subsequent to performing the panning, or
wherein the sound field calculator is configured to perform, in the sound analysis, a time-frequency conversion of the sound field description to obtain audio signals for a plurality of frequency bins of a time frame as the source signals, to calculate directions of arrival for the plurality of frequency bins as the directions of the source signals related to the reference location, to calculate the new direction for each frequency bin to obtain the new directions of the source signals related to the different reference location, to calculate the distance information for each frequency bin to obtain the distance information for the source signals related to the different reference location, and, in order to synthesize the modified sound field description, to perform a direct synthesis for each frequency bin using a corresponding audio signal for a frequency bin of the plurality of frequency bins, a panning gain for the frequency bin of the plurality of frequency bins derived from the new direction for the frequency bin of the plurality of frequency bins and a scaling factor for the frequency bin of the plurality of frequency bins derived from the distance information for the frequency bin of the plurality of frequency bins to obtain a direct part for the frequency bin of the plurality of frequency bins.

10. The apparatus of claim 9, wherein the sound field calculator is configured to add a diffuse signal to the direct part for the frequency bin of the plurality of frequency bins, the direct part being modified by the distance information distance information for the frequency bin of the plurality of frequency bins before the diffuse signal is added to the direct part.

11. The apparatus of claim 10, wherein the sound analysis is configured to determine the source signals by a source separation algorithm and to subtract at least some of the source signals from the sound field description to obtain the diffuse signal.

12. The apparatus of claim 9, wherein the sound field calculator is configured
to perform a diffuse synthesis using a diffuse audio signal derived from the audio signal for the frequency bin of the plurality of frequency bins and using a diffuseness parameter derived by the sound analysis for the frequency bin of the plurality of frequency bins to obtain a diffuse part and to combine the direct part and the diffuse part to obtain a synthesized audio signal for the frequency bin of the plurality of frequency bins; and
to perform a frequency-time conversion using synthesized audio signals for the frequency bins of the plurality of frequency bins for the time frame to obtain a time domain synthesized audio signal as the modified sound field description.

13. A method of generating a modified sound field description, the method comprising:
receiving a sound field description and meta data relating to spatial information of the sound field description; and
calculating the modified sound field description using the spatial information, the sound field description and a translation information indicating a translation from a reference location to a different reference location,
wherein the sound field description comprises a plurality of sound field components, the plurality of sound field components comprising an omnidirectional component and at least one directional component, and wherein the calculating comprises: analyzing the sound field components to derive, for different frequency bins, a direction of arrival information; calculating a modified direction of arrival information per frequency bin using the direction of arrival information and the meta data, the meta data comprising a depth map associating a distance information to a source represented by the frequency bin; and calculating the modified sound field description using a distance compensation information depending on the distance information provided by the depth map for the source represented by the frequency bin, and a new distance associated with the frequency bin being related to the modified direction of arrival information, or wherein the calculating comprises, for one or more sound sources, calculating a first vector pointing from the reference location to a sound source of the one or more sound sources obtained by an analysis of a sound field described by the sound field description; calculating a second vector pointing from the different reference location to the sound source of the one or more sound sources using the first vector and the translation information, the translation information defining a translation vector from the reference location to the different reference location; and calculating a distance modification value using the different reference location, a location of the sound source of the one or more sound sources, and the second vector, or using a distance from the different reference location to the location of the sound source of the one or more sound sources and the second vector, or wherein calculating comprises: determining source signals from the sound field description and directions of the source signals related to the reference location by a sound analysis; calculating new directions of the source signals related to the different reference location using the translation information; calculating distance information for the source signals related to the different reference location; and synthesizing the modified sound field description using the distance information, the source signals and the new directions, wherein the synthesizing the modified sound field description comprises panning a source signal of the source signals to a direction given by the new direction in relation to a replay setup, and scaling the source signal using the distance information before performing the panning or subsequent to performing the panning, or wherein the calculating comprises, a time-frequency conversion of the sound field description in the sound analysis to obtain audio signals for a plurality of frequency bins of a time frame as the source signals, calculating directions of arrival for the plurality of frequency bins as the directions of the source signals related to the reference location, calculating the new direction for each frequency bin to obtain the new directions of the source signals related to the different reference location, calculating the distance information for each frequency bin to obtain the distance information for the source signals related to the different reference location, and, in order to synthesize the modified sound field description, performing a direct synthesis for each frequency bin using a corresponding audio signal for a frequency bin of the plurality of frequency bins, a panning gain for the frequency bin of the plurality of frequency bins derived from the new direction for the frequency bin of the plurality of frequency bins and a scaling factor for the frequency bin of the plurality of frequency bins derived from the distance information for the frequency bin of the plurality of frequency bins to obtain a direct part for the frequency bin of the plurality of frequency bins.

14. A non-transitory storage medium having stored thereon a computer program for performing, when running on a computer or a processor, a method of generating a modified sound field description, the method comprising:

receiving a sound field description and meta data relating to spatial information of the sound field description; and receiving a sound field description and meta data relating to spatial information of the sound field description, wherein the sound field description comprises a plurality of sound field components, the plurality of sound field components comprising an omnidirectional component and at least one directional component, and wherein the calculating comprises: analyzing the sound field components to derive, for different frequency bins, a direction of arrival information; calculating a modified direction of arrival information per frequency bin using the direction of arrival information and the meta data, the meta data comprising a depth map associating a distance information to a source represented by the frequency bin; and calculating the modified sound field description using a distance compensation information depending on the distance information provided by the depth map for the source represented by the frequency bin, and a new distance associated with the frequency bin being related to the modified direction of arrival information, or wherein the calculating comprises, for one or more sound sources, calculating a first vector pointing from the reference location to a sound source of the one or more sound sources obtained by an analysis of a sound field described by the sound field description; calculating a second vector pointing from the different reference location to the sound source of the one or more sound sources using the first vector and the translation information, the translation information defining a translation vector from the reference location to the different reference location; and calculating a distance modification value using the different reference location, a location of the sound source of the one or more sound sources, and the second vector, or using a distance from the different reference location to the location of the sound source of the one or more sound sources and the second vector, or wherein calculating comprises: determining source signals from the sound field description and directions of the source signals related to the reference location by a sound analysis; calculating new directions of the source signals related to the different reference location using the translation information; calculating distance information for the source signals related to the different reference location; and synthesizing the modified sound field description using the distance information, the source signals and the new directions, wherein the synthesizing the modified sound field description comprises panning a source signal of the source signals to a direction given by the new direction in relation to a replay setup, and scaling the source signal using the distance information before performing the panning or subsequent to performing the panning, or wherein the calculating comprises, a time-frequency conversion of the sound field description in the sound analysis to obtain audio signals for a plurality of frequency bins of a time frame as the source signals, calculating directions of arrival for the plurality of frequency bins as the directions of the source signals related to the reference location, calculating the new direction for each frequency bin to obtain the new directions of the source signals related to the different reference location, calculating the distance information for each frequency bin to obtain the distance information for the source signals related to the different reference location, and, in order to synthesize the modified sound field description, performing a direct synthesis for each frequency bin using a corresponding audio signal for a frequency bin of the plurality of frequency bins, a panning gain for the frequency bin of the plurality of frequency bins derived from the new direction for the frequency bin of the plurality of frequency bins and a scaling factor for the frequency bin of the plurality of frequency bins derived from the distance information for the frequency bin of the plurality of frequency bins to obtain a direct part for the frequency bin of the plurality of frequency bins.

* * * * *